(12) United States Patent
Abdollahi et al.

(10) Patent No.: US 9,069,166 B2
(45) Date of Patent: Jun. 30, 2015

(54) GAZE DETECTING HEADS-UP DISPLAY SYSTEMS

(71) Applicant: RECON INSTRUMENTS INC., Vancouver (CA)

(72) Inventors: Hamid Abdollahi, Vancouver (CA); Etienne Jonathan Naugle, New Westminster (CA); Reynald Antoine Hoskinson, Vancouver (CA)

(73) Assignee: RECON INSTRUMENTS INC., Vancouver (CA)

( * ) Notice: Subject to any disclaimer, the term of this patent is extended or adjusted under 35 U.S.C. 154(b) by 56 days.

(21) Appl. No.: 13/781,386

(22) Filed: Feb. 28, 2013

(65) Prior Publication Data
US 2013/0222235 A1 Aug. 29, 2013

Related U.S. Application Data

(63) Continuation-in-part of application No. 13/740,030, filed on Jan. 11, 2013, now Pat. No. 9,001,005.

(60) Provisional application No. 61/682,675, filed on Aug. 13, 2012, provisional application No. 61/604,993, filed on Feb. 29, 2012.

(51) Int. Cl.
*G02B 27/01* (2006.01)
*G06F 3/01* (2006.01)
(Continued)

(52) U.S. Cl.
CPC ............ *G02B 27/0172* (2013.01); *G06F 3/013* (2013.01); *G09G 5/006* (2013.01); *G06F 1/163* (2013.01); *G06F 1/3265* (2013.01); *Y02B 60/1242* (2013.01)

(58) Field of Classification Search
CPC .................. G09G 2330/021; G09G 2330/027; G06F 1/3265; G06F 3/013; G02B 27/01–2027/0198
USPC ........................................................ 345/7–8
See application file for complete search history.

(56) References Cited

U.S. PATENT DOCUMENTS

| | | |
|---|---|---|
| 4,526,473 A | 7/1985 | Zahn, III |
| 5,045,700 A | 9/1991 | Crowson et al. |

(Continued)

FOREIGN PATENT DOCUMENTS

| | | |
|---|---|---|
| EP | 1777953 A1 | 4/2007 |
| WO | 2011/044680 A1 | 4/2011 |

(Continued)

OTHER PUBLICATIONS

Karalis et al., "Efficient wireless non-radiative mid-range energy transfer", Annals of Physics, 323, (2008), pp. 34-48.

(Continued)

*Primary Examiner* — Michael Pervan
(74) *Attorney, Agent, or Firm* — Richard A. Johnson; Borden Ladner Gervais LLP

(57) ABSTRACT

A display system for a head-mounted device comprising a display for displaying information. The display system includes a glance detector comprising a light source, disposed proximate the display, for transmitting light toward an eye of a user of the head-mounted device, a light detector, disposed proximate the light source, for detecting light reflected from the eye of the user and generating a voltage based on the detected light. The display system also includes a processor operably coupled to the display, and the gaze detector and configured to control the display to turn-on the display based on the voltage received from the glance detector.

23 Claims, 23 Drawing Sheets

(51) Int. Cl.
*G09G 5/00* (2006.01)
*G06F 1/16* (2006.01)
*G06F 1/32* (2006.01)

(56) References Cited

U.S. PATENT DOCUMENTS

| | | | |
|---|---|---|---|
| 5,331,149 | A | 7/1994 | Spitzer et al. |
| 5,343,313 | A | 8/1994 | Fergason |
| 5,491,510 | A | 2/1996 | Gove |
| 5,635,948 | A | 6/1997 | Tonosaki |
| 5,813,990 | A | 9/1998 | Ryll |
| 6,124,976 | A | 9/2000 | Miyazaki |
| 6,431,705 | B1 | 8/2002 | Linden |
| 6,483,646 | B2 | 11/2002 | Scott et al. |
| 7,038,639 | B1 | 5/2006 | Olstad et al. |
| D537,078 | S | 2/2007 | Tanaka et al. |
| 7,192,137 | B2 | 3/2007 | Ishibashi et al. |
| D559,250 | S | 1/2008 | Pombo |
| 7,375,701 | B2 | 5/2008 | Covannon et al. |
| D578,120 | S | 10/2008 | Lowe et al. |
| 7,595,933 | B2 | 9/2009 | Tang |
| 7,825,996 | B2 | 11/2010 | Yamada et al. |
| 7,952,059 | B2 | 5/2011 | Vitale et al. |
| D659,136 | S | 5/2012 | Matsumoto |
| D659,137 | S | 5/2012 | Matsumoto |
| D659,741 | S | 5/2012 | Heinrich et al. |
| D660,341 | S | 5/2012 | Olsson et al. |
| 8,203,502 | B1 | 6/2012 | Chi et al. |
| D664,185 | S | 7/2012 | Heinrich et al. |
| 8,212,859 | B2 | 7/2012 | Tang et al. |
| 8,235,529 | B1 | 8/2012 | Raffle et al. |
| D682,267 | S | 5/2013 | Mase |
| D682,268 | S | 5/2013 | Ricks et al. |
| 8,467,133 | B2 | 6/2013 | Miller |
| 2003/0201911 | A1 | 10/2003 | Kennedy |
| 2005/0116882 | A1 | 6/2005 | Yamazaki et al. |
| 2007/0078552 | A1* | 4/2007 | Rosenberg ............ 700/94 |
| 2008/0186586 | A1 | 8/2008 | Yamamoto |
| 2009/0040296 | A1 | 2/2009 | Moscato |
| 2009/0091838 | A1 | 4/2009 | Zaloum et al. |
| 2009/0102986 | A1 | 4/2009 | Yamamoto |
| 2010/0060551 | A1 | 3/2010 | Sugiyama et al. |
| 2010/0097580 | A1 | 4/2010 | Yamamoto et al. |
| 2010/0103077 | A1 | 4/2010 | Sugiyama et al. |
| 2010/0254017 | A1 | 10/2010 | Martins |
| 2011/0018903 | A1 | 1/2011 | Lapstun et al. |
| 2011/0128364 | A1* | 6/2011 | Ono ............................ 348/78 |
| 2011/0211260 | A1 | 9/2011 | Yamamoto |
| 2011/0213644 | A1 | 9/2011 | Phene |
| 2012/0013843 | A1 | 1/2012 | Jannard |
| 2012/0300978 | A1* | 11/2012 | Eberl et al. ............ 382/103 |
| 2012/0310391 | A1 | 12/2012 | Sanders |
| 2013/0257709 | A1 | 10/2013 | Raffle et al. |

FOREIGN PATENT DOCUMENTS

| | | |
|---|---|---|
| WO | 2011/085501 A1 | 7/2011 |
| WO | 2013/000075 A1 | 1/2013 |

OTHER PUBLICATIONS

Kopin, "Kopin Golden-i Head-Mounted Display Delivers True Hands-free Mobility", Microsoft, May 2009, pp. 1-2.

Goddard, Louis, "Olympus announces Project Glass-style wearable display prototype", The Verge, Jul. 5, 2012.

Purcher, Jack, "The Next Step in Apple's Glass Project Revealed!", Patentably Apple, Dec. 7, 2012.

Notice of Allowance dated Feb. 12, 2014 received in related Design U.S. Appl. No. 29/455,741.

Partial European Search Reported dated Jun. 5, 2013 issued against related European Application No. 13157144.0.

European Search Report dated Jul. 15, 2013 issued against related European Application No. 13157144.0.

\* cited by examiner

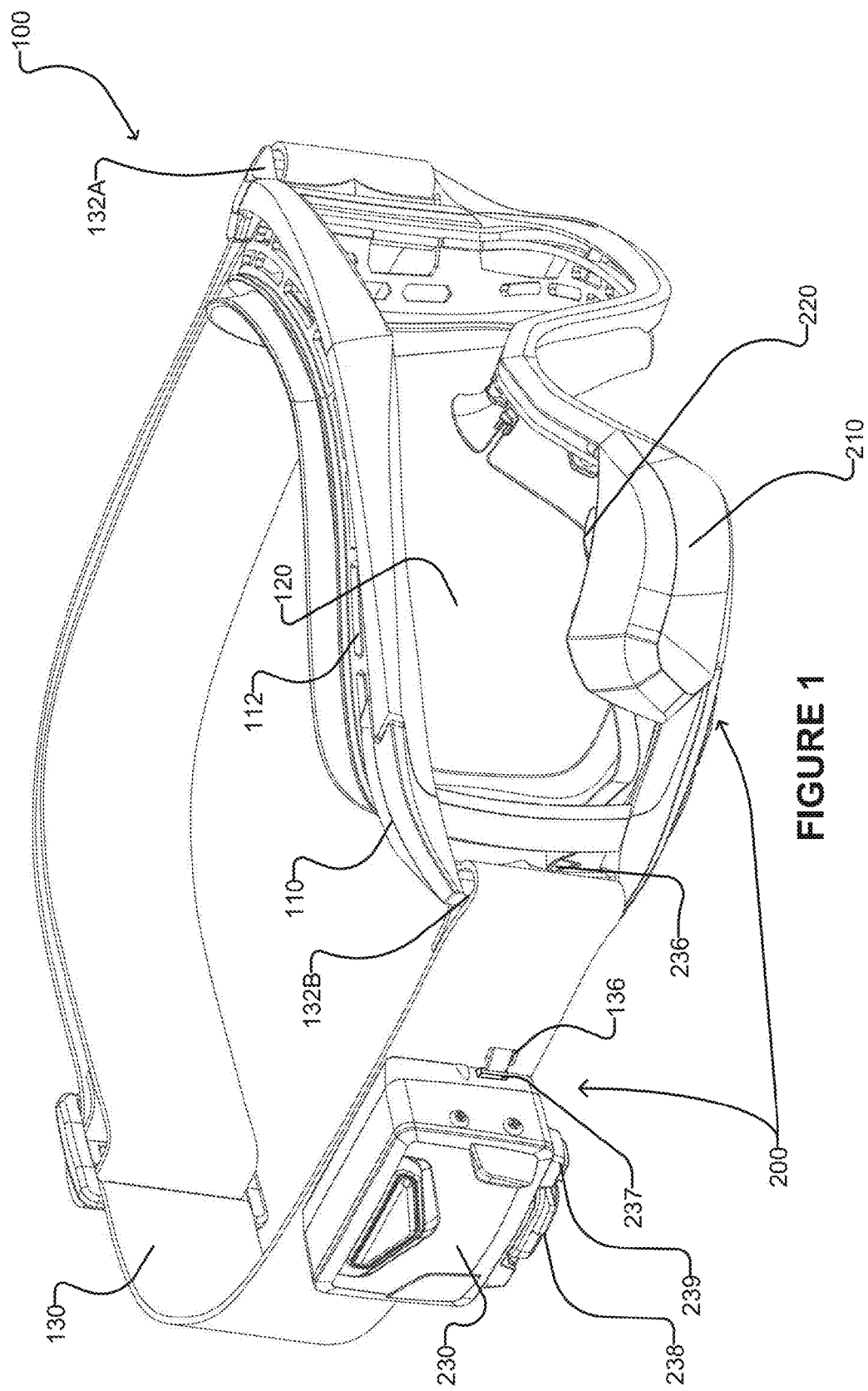

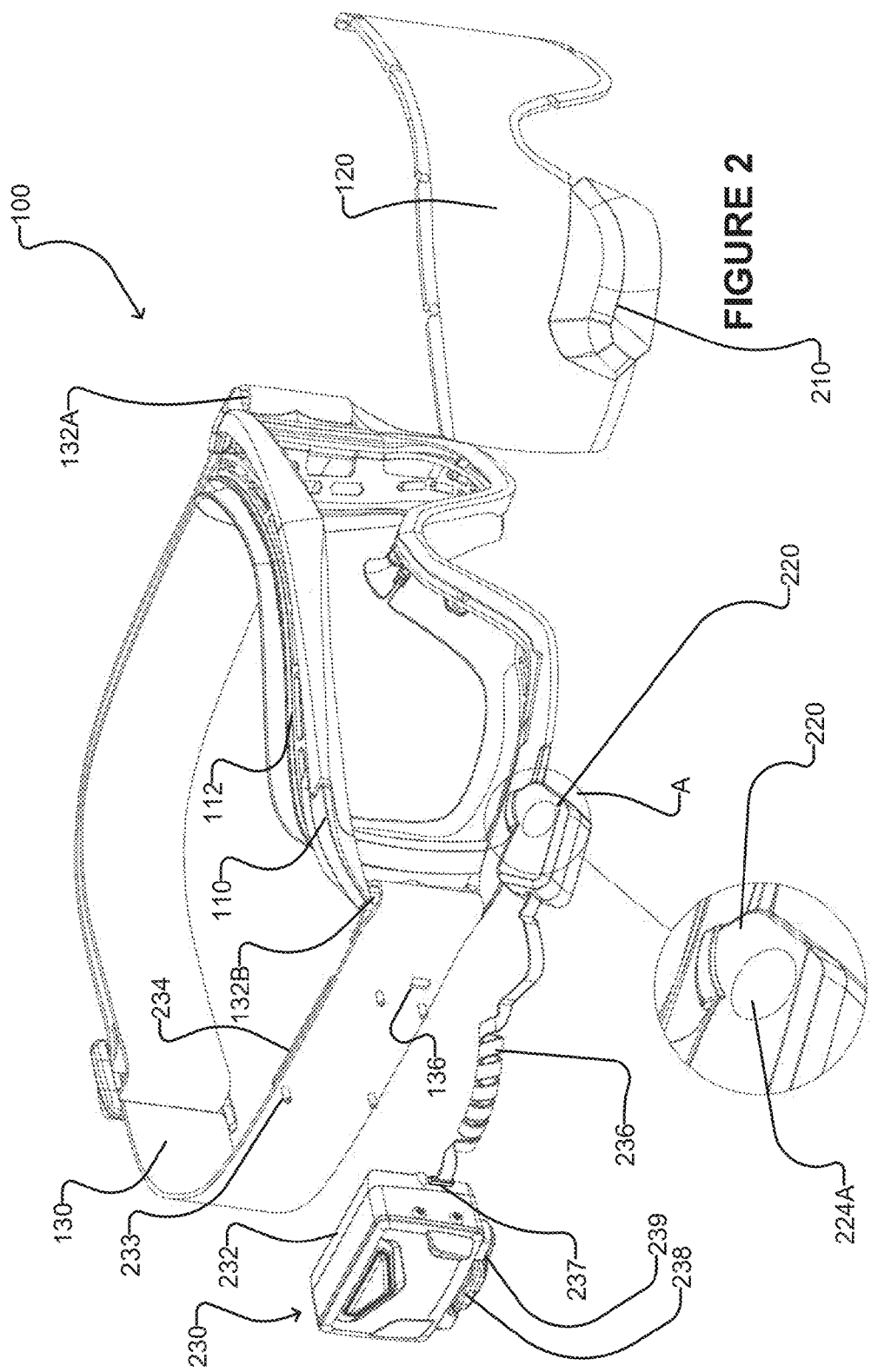

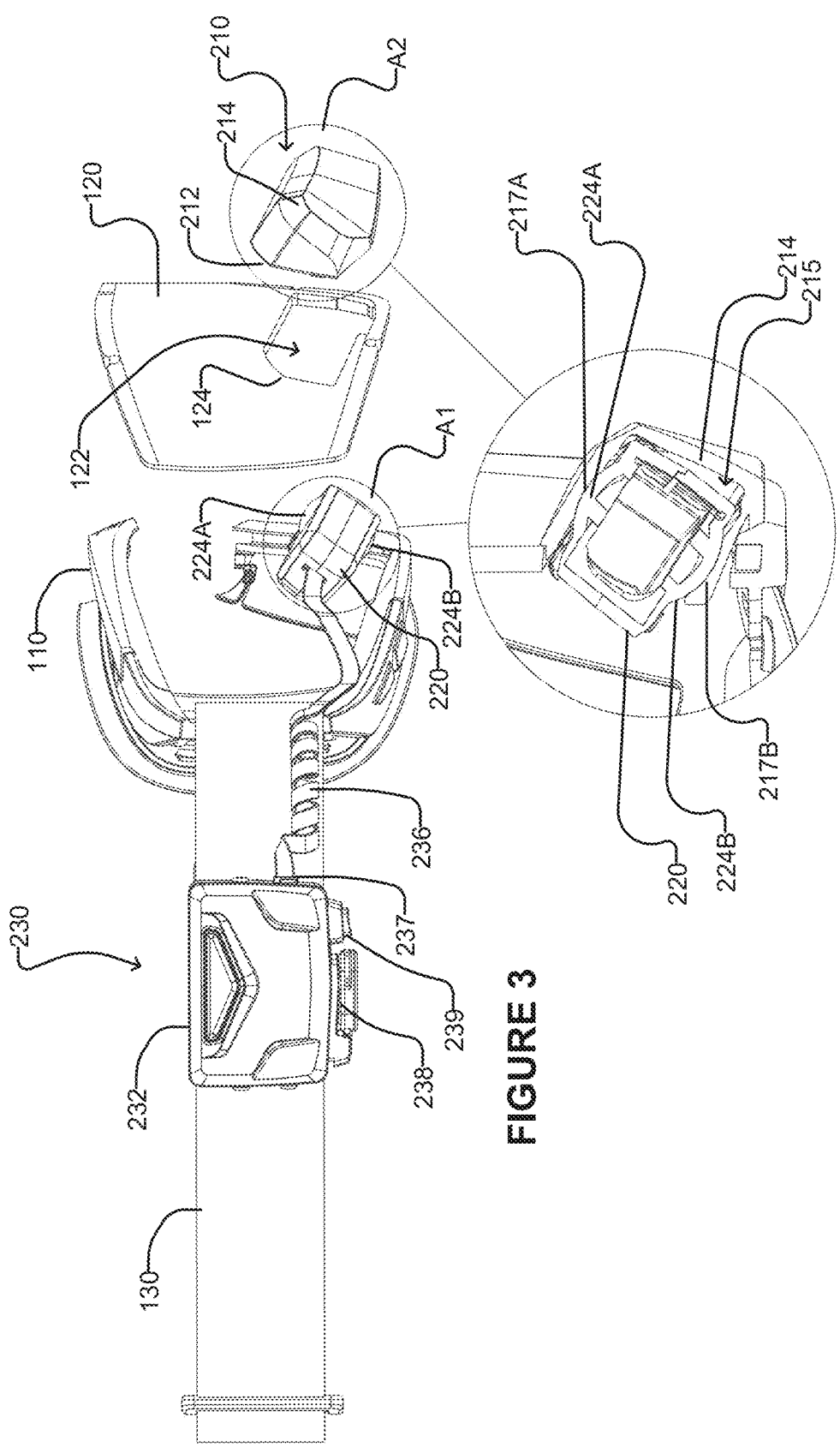

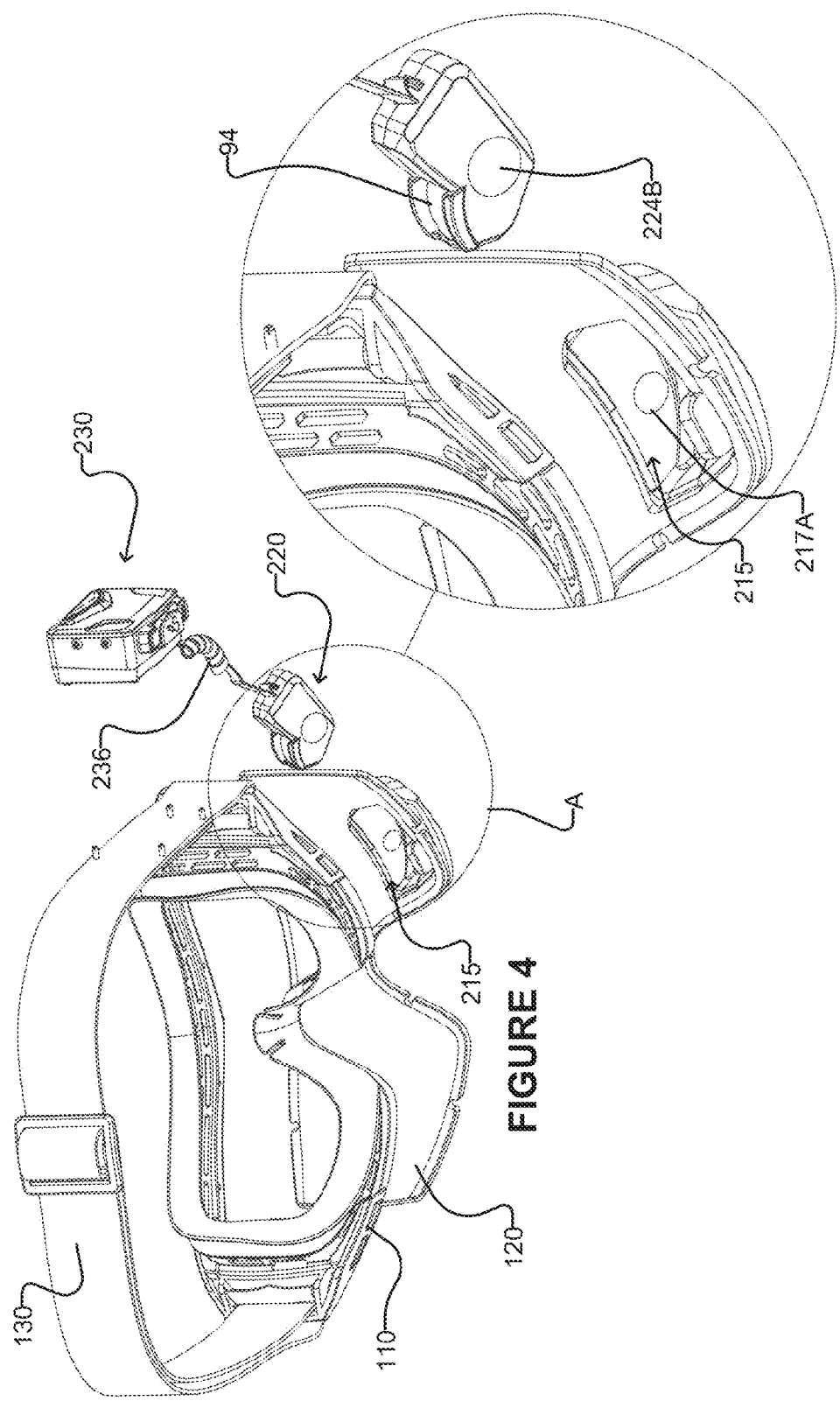

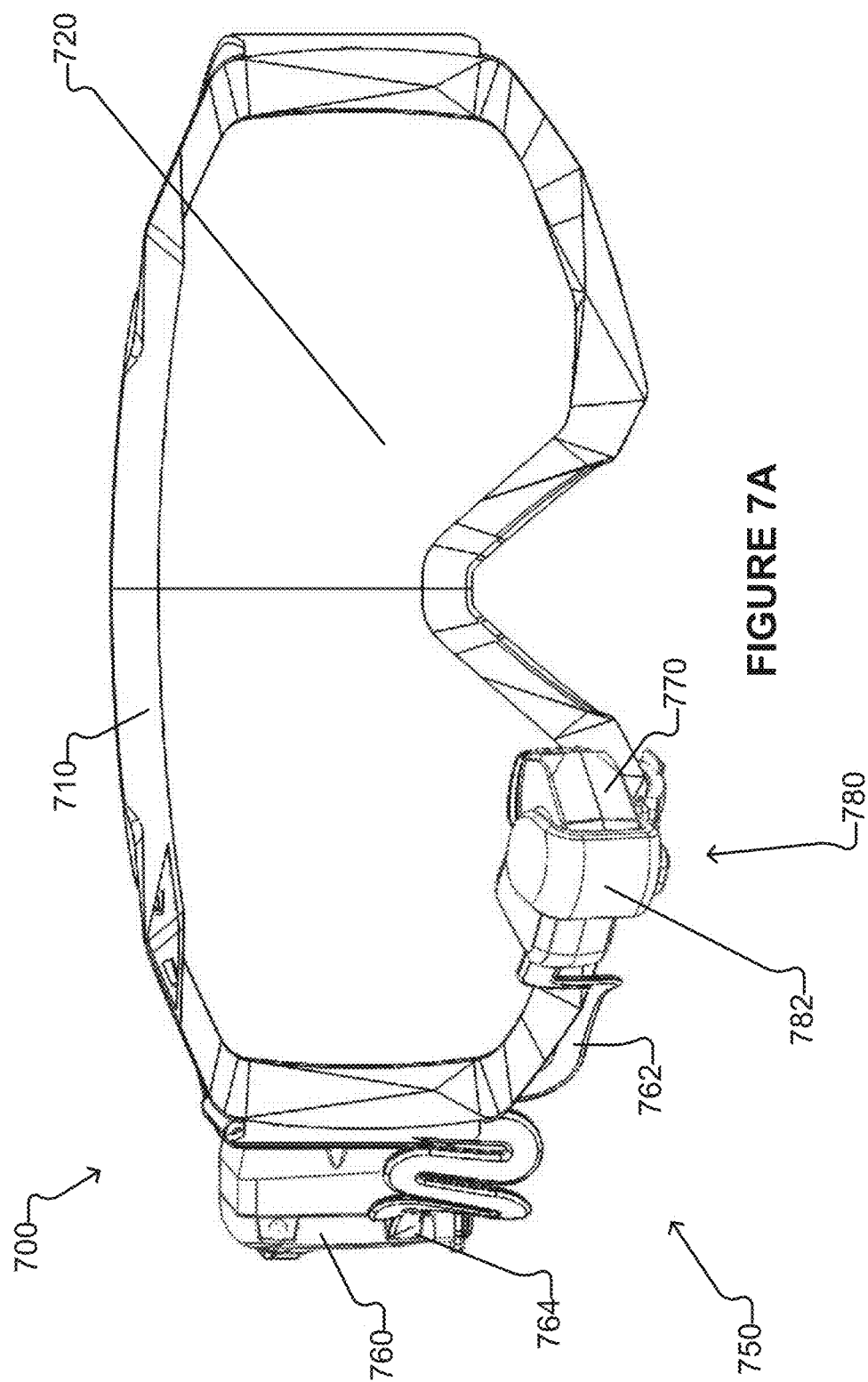

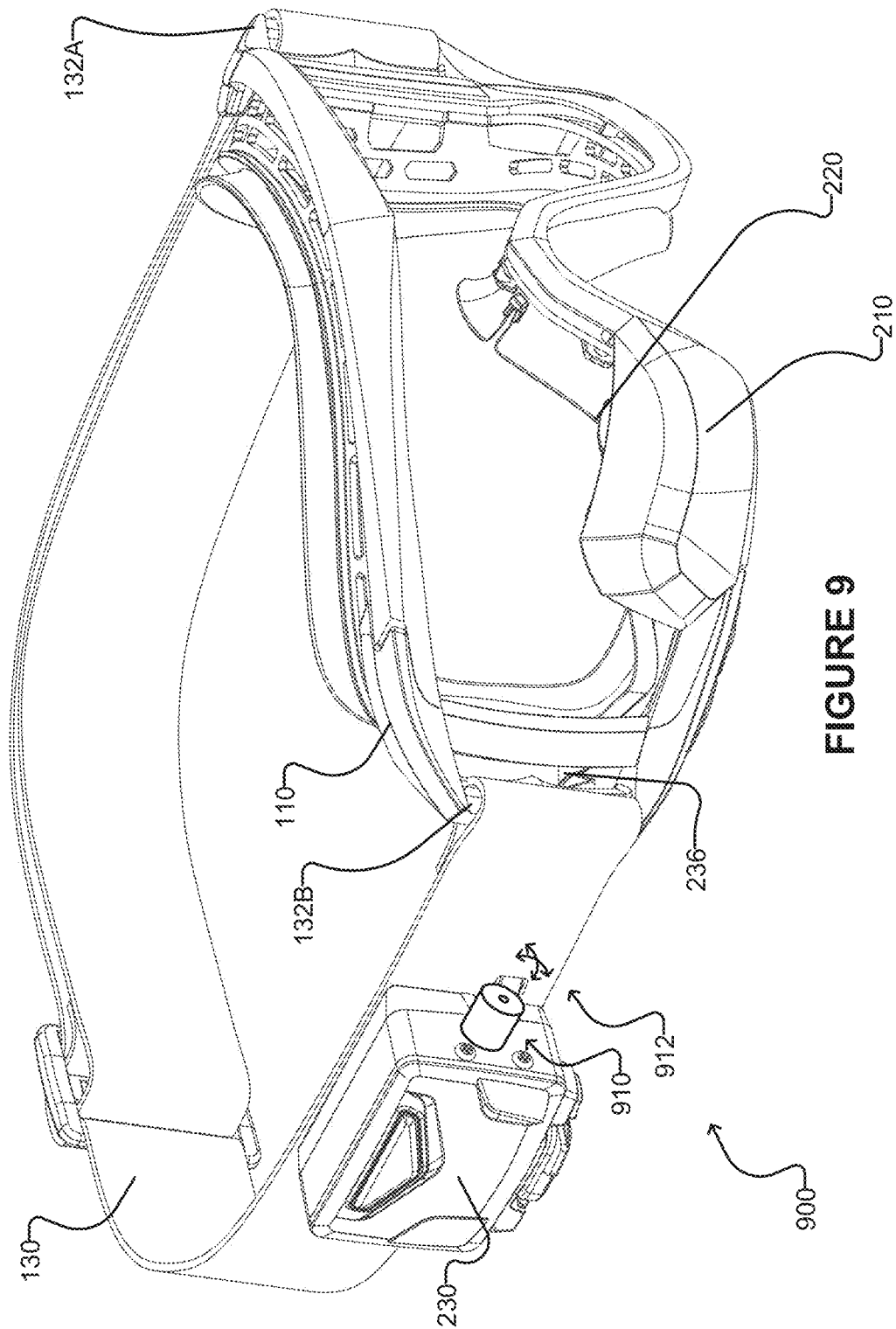

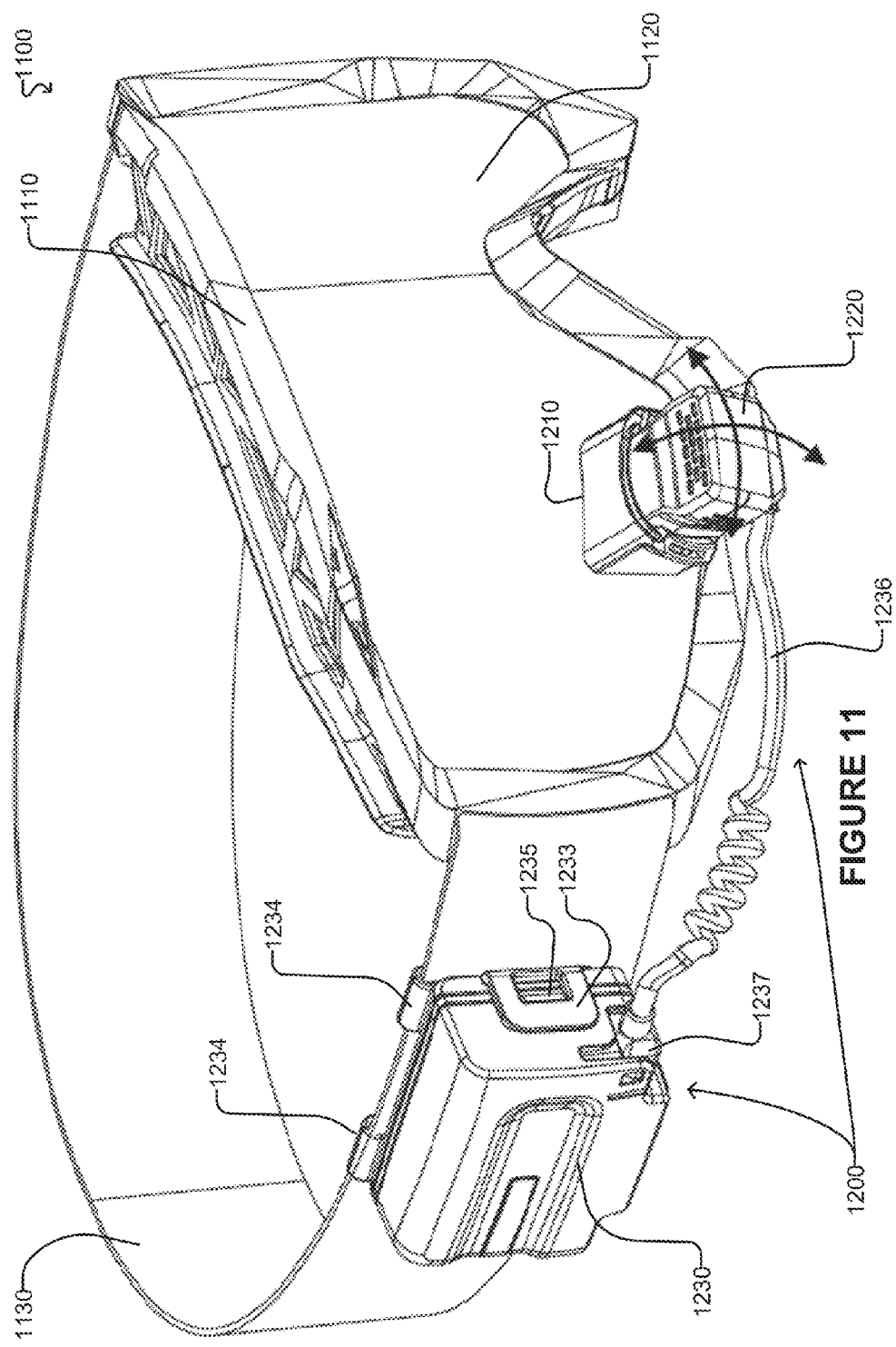

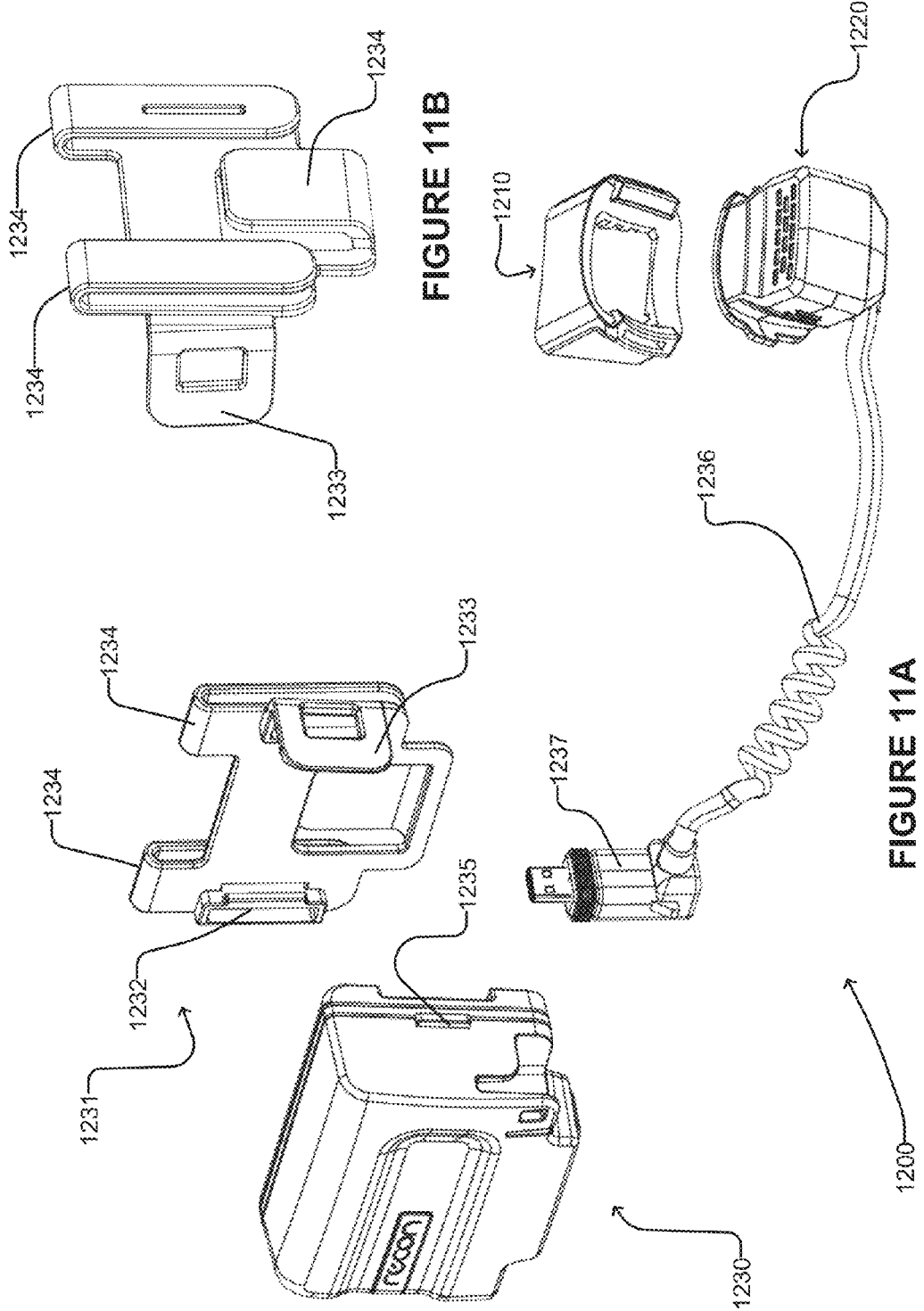

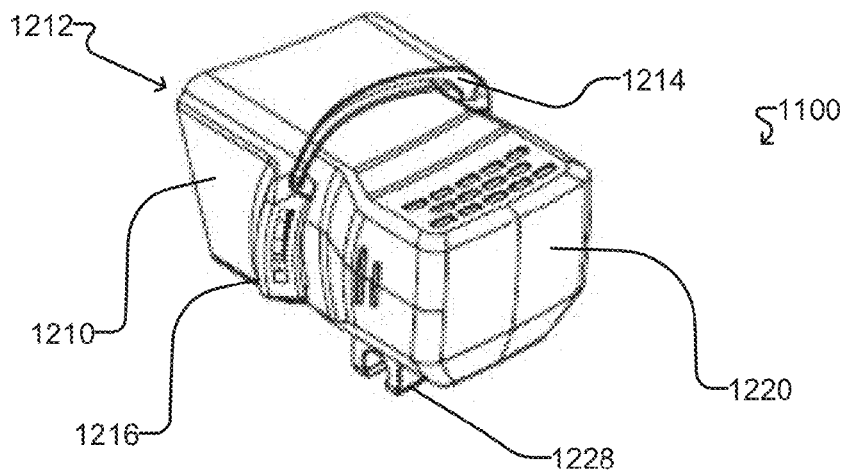
FIGURE 12
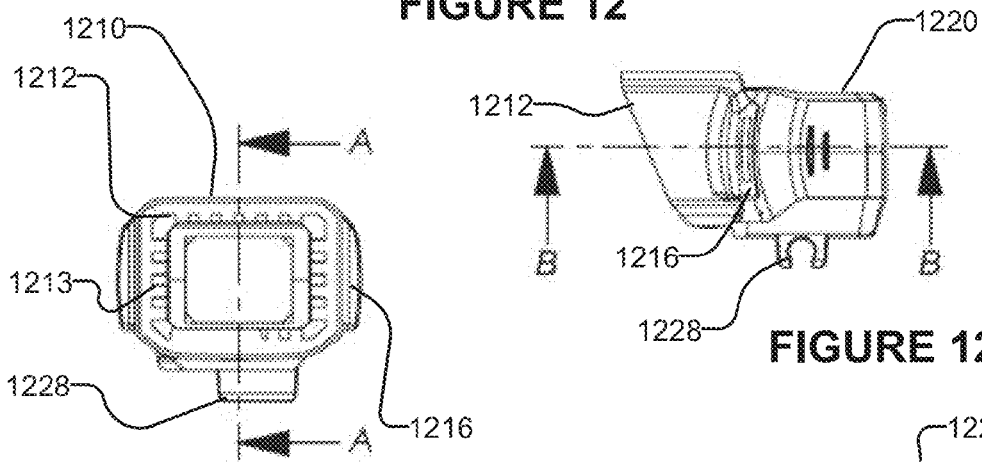
FIGURE 12A
FIGURE 12B
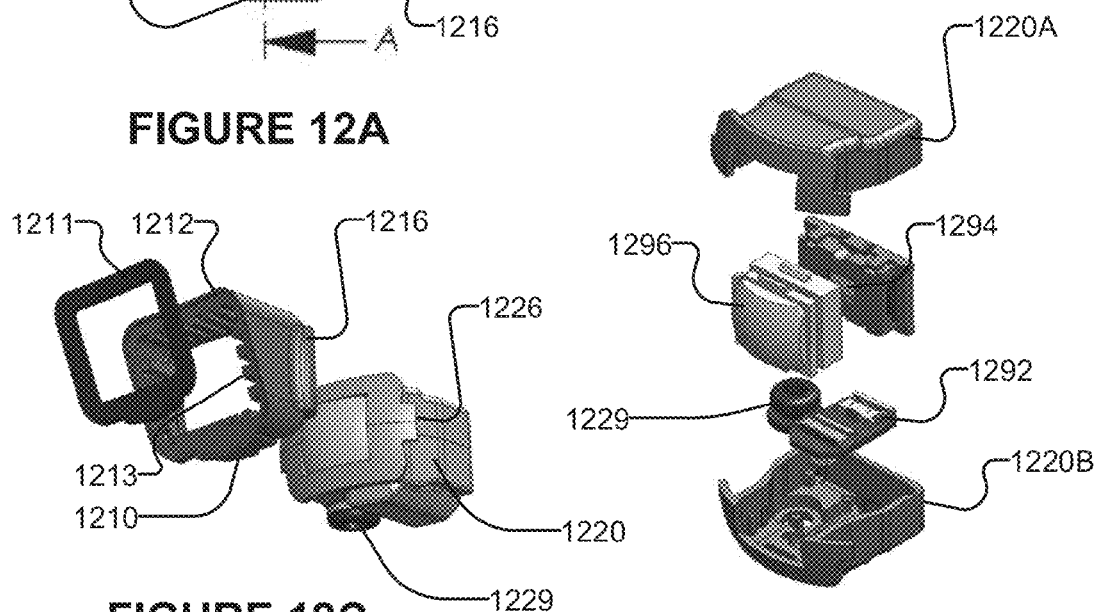
FIGURE 12C
FIGURE 12D

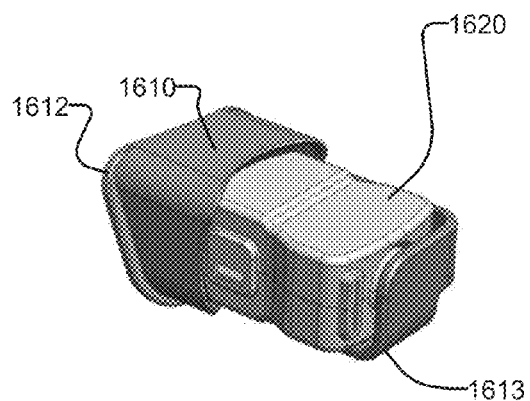 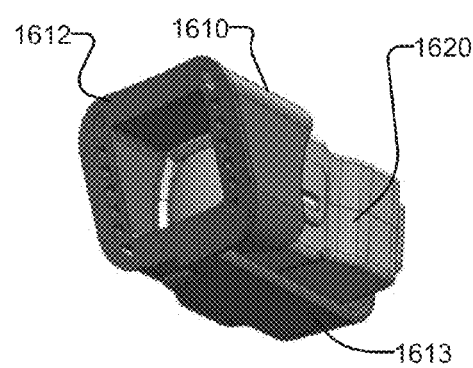
FIGURE 16A    FIGURE 16B
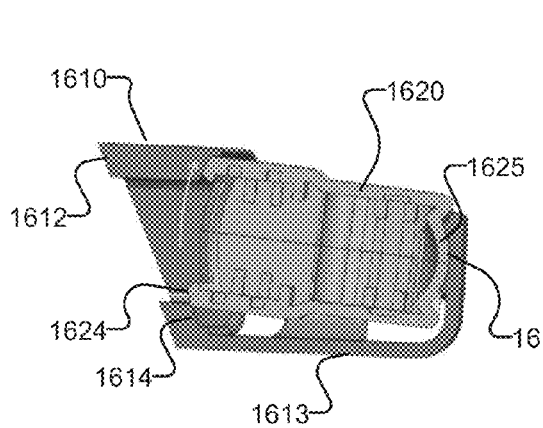 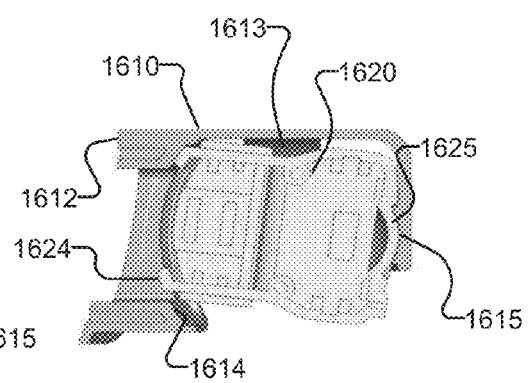
FIGURE 16C    FIGURE 16D

GAZE DETECTING HEADS-UP DISPLAY SYSTEMS

CROSS REFERENCE TO RELATED APPLICATIONS

This application claims the benefit of priority of U.S. Provisional Patent Applications No. 61/604,993 filed Feb. 29, 2012, and No. 61/682,675 filed Aug. 13, 2012, and U.S. Non-Provisional patent application Ser. No. 13/740,030 filed Jan. 11, 2013 all of which are incorporated herein by reference in their entirety.

FIELD

This invention relates to modular Heads-Up Display (HUD) systems.

BACKGROUND

Any discussion of the prior art throughout the specification should in no way be considered as an admission that such prior art is widely known or forms part of general common knowledge in the field.

In many activities it is desirable or required that participants wear headgear and/or head and/or eye protection. By way of non-limiting example, many skiers and snowboarders wear goggles, and many motorcyclists and hockey players wear helmets, which may have visors.

Also, there are systems for providing skiers, snowboarders and others taking part in physical activities with information regarding their performance or status. Some current solutions include handheld GPS devices, performance measurement units, wristwatches, and mobile phones. There also exist such information systems built into goggles or helmets such as those disclosed, for example, in International Applications No. PCT/CA2010/001592, No. PCT/CA2011/050023, and No. PCT/CA2012/050121, which are hereby incorporated by reference herein.

Further, many participants in sports and activities that require headgear already possess traditional headgear that does not provide information regarding their performance or status. These participants may not wish to purchase new headgear that does provide such information. Also, manufacturers of head protection may not wish to modify their existing products and production techniques to produce headgear that does provide information regarding their performance or status.

The inventors have determined a need for improved head-mounted information systems.

SUMMARY

This summary is provided to introduce a selection of representative concepts and aspects of the invention in a simplified form that are further described below in the description. This summary is not intended to identify key features or essential features of the claimed subject matter, nor is it intended to be used in any way that would limit the scope of the claimed subject matter.

One aspect provides a Heads Up Display (HUD) system for mounting on a pair of goggles. The HUD system comprises a processing unit configured to be coupled to a strap of the goggles, a display unit connectable to the processing unit and comprising a display configured to display images under control of the processing unit, and, a display mount configured to be coupled to the goggles and adjustably receive the display unit.

The display mount may comprise an enclosure coupled to a lens of the goggles, the enclosure defining a cavity adapted to receive the display unit, and the display unit may be configured to be removably received in the cavity in the enclosure. The display unit may be coupled to the enclosure by a ball-and-socket-type connection, the ball-and-socket type connection preferably comprising ball portions on opposed sides of the display unit configured to be received in socket portions defined in the enclosure. The enclosure may be configured to be attached around an opening in the lens of the goggles.

The display mount may comprise a first end configured to conform to a lens of the goggles and a second end opposite the first end configured to receive the display unit, and the first end of the display mount may be adhesively coupled to the lens of the goggles.

The display mount may have a viewing passage therethrough from the first end to the second end, and an inner surface of the viewing passage may be textured to reduce the amount of light reflected from the inner surface.

The second end of the display mount may comprise a concavely-curved surface and the display unit comprises a corresponding convexly-shaped surface. The second end of the display mount may comprise side portions having slots therein, and the display unit may comprise tabs extending outwardly from the convexly-shaped surface and configured to be received in the slots of the side portions of the display mount. The side portions may be configured to hold the tabs captive therein, and the slots in the side portions may be longer in a vertical direction than the tabs to permit pitch angle adjustment of the display unit with respect to the display mount. The slots in the side portions may be open at top and bottom ends thereof and the display mount may comprise a flange at a bottom portion thereof. The display mount may comprise a deformable catch at a top portion of the second end thereof for releasably retaining the display unit in the display mount. The distance between the side portions may be greater than a width of the display unit behind the tabs to permit yaw angle adjustment of the display unit with respect to the display mount. The second end of the display mount may comprise an extension having a socket portion thereon, and the display unit comprises a ball portion on an end thereof, the ball portion configured to be adjustably received in the socket portion.

The HUD system may be accompanied by at least one template for facilitating adhesive coupling of the display mount to the goggles lens of at least one type of goggles or helmet, for example in a kit, with each template comprising a sheet of material sized and shaped to conform to the goggles lens of the corresponding type of goggles or helmet, and an opening at a predetermined location on the sheet of material, the opening sized and shaped to conform to the first end of the display mount.

The display mount may comprise a clip configured to engage a bottom portion of a frame of the goggles, a first end configured to abut a lens of the goggles and a second end opposite the first end configured to receive the display unit. The clip may be shaped to conform to a profile of the bottom portion of the frame of the goggles and may comprise a lower lip configured to engage a notch in an underside of the bottom portion of the frame of the goggles, and an upper lip configured to fit between the lens of the goggles and the bottom portion of the frame of the goggles.

The display unit may comprise a glance detector configured to determine whether a user is looking at the display.

A cable may be coupled between the processing unit and the display unit, the cable comprising a connector head at least one end thereof configured to removably couple the cable to one of the processing unit and the display unit.

A strap connector may be provided for coupling the processing unit to the strap of the goggles, the strap connector having a first side comprising one or more clips configured to engage the strap of the goggles and a second side opposite the first side, the second side comprising connecting features configured to engage corresponding connecting features on the processing unit. The connecting features on the processing unit may comprise a slot in one end thereof and a tab on the opposite end thereof, and the connecting features on the second side of the strap connector may comprise first and second protrusions extending from the second side, the first protrusion having a tab thereon configured to be inserted into the slot of the processing unit, and the second protrusion having a slot thereon configured to receive the tab of the processing unit.

One aspect provides a pair of goggles adapted to receive a HUD system. The goggles comprise a frame, a strap coupled to the frame for holding the frame in place on a user's head, and a lens received in an opening in the frame, the lens comprising an enclosure coupled to the lens, the enclosure extending forwardly from the lens and defining a cavity adapted to receive a display unit.

One aspect provides a method of adapting a pair of goggles to receive a HUD system. The goggles comprise a frame, a strap coupled to the frame for holding the frame in place on a user's head, and a lens received in an opening in the frame. The method comprises forming an aperture in the lens, and attaching an enclosure to the lens around the aperture, the enclosure defining a cavity configured to receive a display unit of the HUD system.

One aspect provides a head-mounted device comprising: a display for displaying information and a glance detector disposed proximate the display. The glance detector comprises a light source for transmitting light toward a pupil of an eye of a user of the head-mounted device; and a light detector for detecting light reflected from the pupil of the eye of the user and generating a voltage based on the detected light; and a processor for controlling the display and receiving the voltage from the gaze detector, the processor configured to turn-on the display based on the voltage received from the gaze detector.

In addition to the exemplary aspects and embodiments described above, further aspects and embodiments will become apparent by reference to the drawings and by study of the following detailed descriptions.

BRIEF DESCRIPTION OF THE DRAWINGS

The accompanying drawings show non-limiting example embodiments.

FIG. 1 is a perspective view of a pair of goggles with a Heads-Up Display (HUD) system according to an example embodiment.

FIG. 2 is an exploded view of the goggles with a modular HUD system of FIG. 1.

FIG. 2A is an enlarged view of the area of circle A of FIG. 2.

FIG. 3 is a side exploded view of the goggles with a modular HUD system of FIG. 1.

FIG. 3A is a sectional view through the display unit shown in circle A1 of FIG. 3 and the enclosure shown in circle A2 of FIG. 3.

FIG. 4 is a rear perspective exploded view of the goggles with a modular HUD system of FIG. 1.

FIG. 4A is an enlarged view of the area of circle A of FIG. 4.

FIG. 7A is a front view of a pair of goggles with a modular HUD system according to another example embodiment.

FIG. 9 is a perspective view of a pair of goggles with a modular HUD system according to another example embodiment.

FIG. 11 is a perspective view of a pair of goggles with a modular HUD system according to another example embodiment.

FIG. 11A is an exploded view of the HUD system of FIG. 11.

FIG. 11B shows the strap connector of FIG. 11 in isolation.

FIG. 12 shows the display unit and display mount of FIG. 11 in isolation.

FIG. 12A is a front view of the display unit and display mount of FIG. 12.

FIG. 12B is a side view of the display unit and display mount of FIG. 12.

FIG. 12C is an exploded view of a display mount and display unit according to another embodiment.

FIG. 12D is an exploded view of the display unit of FIG. 12C.

FIGS. 16A through 16D show a display unit and display mount according to another embodiment.

Throughout the drawings and description like reference symbols are used to indicate like elements.

DETAILED DESCRIPTION

Figure 5A:
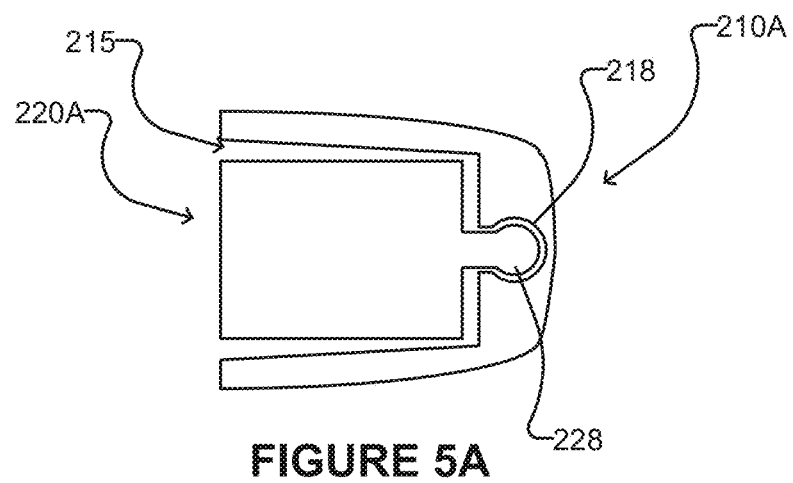
FIG. 5A is a sectional view of a display unit and enclosure according to another example embodiment.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Certain embodiments of the invention provide modular head-mounted information and display systems which may be coupled to headgear such as goggles, helmets or the like. Some embodiments provide modular head-mounted systems which are adjustable to accommodate installation in a variety of sizes and shapes of headgear. It is to be understood that embodiments may provide modular head-mounted systems for use with any type of headgear adapted to receive such systems.

FIGS. 1 to 4 show a pair of goggles 100 and a modular Heads-Up Display (HUD) system 200 according to an example embodiment. Goggles 100 are adapted to receive HUD system 200. Goggles 100 may be configured to be fully functional with or without HUD system 200 installed. Such a configuration permits goggles 100 to be sold separately from HUD system 200. In some embodiments goggles 100 may initially be produced as fully functional without HUD system 200 and later goggles 100 may be modified to receive HUD system 200.

Goggles 100 comprise a frame 110 that holds a lens assembly 120 and is connected to strap 130. Lens assembly 120 may comprise, for example, a cylindrical dual lens with a silicone seal, with an airtight space between the lenses to reduce fogging. The lenses may both have a 6 inch (15.25 cm) radial base curvature. The lenses may be coated with an anti fog sealant. Lens assembly 120 may also comprise any other type of single or dual lens assembly. The illustrated embodiment does not include ventilation holes in lens assembly 120, but lens assembly 120 may be ventilated in some embodiments. Frame 110 may also include a standard ventilation system 112 as known in the art. Frame 110 of goggles 100 is adapted to receive lens assembly 120. Strap 130 may be adjustable, flexible, and/or elastic as known in the art. Strap 130 may be removably or permanently attached to frame 110 at attachment points 132A, 132B.

HUD system 200 is coupled to goggles 100. In the illustrated embodiment, a portion of HUD system 200 is coupled to lens assembly 120, and a portion of HUD system 200 is coupled to strap 130. In some embodiments, portions of HUD system 200 may also be coupled to other locations on lens assembly 120 and/or strap 130, and/or to other components of goggles 100, such as, for example, frame 110.

HUD system 200 can be used by skiers or snowboarders or other athletes to increase the usefulness of their headgear. As discussed further below, HUD system 200 may sense various types of motion and other parameters and provide a user with real time information such as their position, their performance (e.g. speed, airtime, direction, video, etc.). In some embodiments, once installed, HUD system 200 is coupled to goggles 100 and does not interfere with the regular activities of the user.

As best seen in FIG. 3, lens assembly 120 has opening 122 defined therein configured to receive a display mount adapted to receive a display unit in the form of an enclosure 210. Enclosure 210 is configured to adjustably receive a display unit 220 of HUD system 200. Display unit 220 comprises a display 94, and is operably coupled to an electronics compartment 230 attached to strap 130 as described below. Compartment 230 may be coupled to goggles 100, for example by clipping or otherwise securing to strap 130. Compartment 230, while shown on strap 130 on the right side of frame 110 in the illustrated example embodiment, may be positioned on either side of frame 110. Similarly, opening 122, enclosure 210 and display unit 220 may be positioned on either half, or at any location, of lens assembly 120.

Enclosure 210 is coupled to lens assembly 120 to cover opening 122. Opening 122 has a perimeter 124 configured to substantially conform to a perimeter 212 of enclosure 210. In some embodiments, opening 122 may be formed when lens assembly 120 is manufactured. For example, lens assembly 120 may be formed with opening 122 therein by injection molding, three dimensional printing, or other techniques as known in the art. In other embodiments, lens assembly 120 may be modified after manufacturing to form opening 122. Opening 122 may be formed in lens assembly 120 with lens assembly 120 held in frame 110 in some embodiments, or may be formed after first removing lens assembly 120 from frame 110 in some embodiments. In some embodiments, opening 122 may be formed by cutting a portion of lens assembly 120. In other embodiments, opening 122 may be formed by a heated punch, a router, or other means. Opening 122 may be sized and shaped to allow a user to access and manipulate display unit 220 from the inside of goggles 100 in some embodiments. For example, in some embodiments, opening 122 may be sized to permit display unit 220 to pass therethrough.

Enclosure 210 comprises a shell 214, which defines a cavity 215 configured to receive display unit 220, as described below. Shell 214 may be made of a rigid material such as High Density Polyethylene (HDPE), Poly Vinyl Chloride (PVC), high density rubber or the like. In other embodiments shell 214 may be made of a deformable resilient material such as polystyrene, Low Density Polyethylene (LDPE), low density rubber or the like. Shell 214 may provide protection for display unit 220. In some embodiments, an exterior surface of shell 214 may be aerodynamically shaped to reduce or minimize wind resistance.

Enclosure 210 may be shaped to substantially conform to the shape of opening 122 in some embodiments. In some embodiments, perimeter 212 may be larger than opening 122 such that enclosure 210 overlaps onto a front face of lens assembly 110 around opening 112. In some embodiments enclosure 210 may comprise resiliently deformable couplings that provide for a snap-fit connection between enclosure 210 and opening 122. As used herein, the term "snap fit" refers to any releasable connection which is formed at least in part by resilient deformation in one of the connecting components. Such resilient deformation may be relieved once the snap fit connection is made. In other embodiments, enclosure 210 may be ultrasonically welded to lens assembly 120. Enclosure 210 may be welded to the perimeter 124 of opening 122 or outside of perimeter 124 of opening 122. Enclosure 210 may alternatively or additionally be coupled to opening 122 through an adhesive, magnets, screws, rivets, clips or the like.

Enclosure 210 may comprise a gasket (not shown) surrounding the perimeter 212. The gasket may be shaped to provide a seal between enclosure 210 and opening 122 of lens assembly 120. The gasket may be formed of a resiliently deformable material such as plastic, rubber, silicone, or the like. The gasket may be snap-fit to lens assembly 120. That is, the gasket may be resiliently deformed when inserted into opening 122 and return to its undeformed shape to prevent removal of gasket from opening 122 in the opposite direction of insertion.

As best seen in FIG. 3A, in the example embodiment display unit 220 is mounted within a cavity 215 defined in enclosure 210. Display unit 220 may comprise a display 94 and a display driver 92 (see FIG. 6) as discussed in further detail below. Cavity 215 may be configured to substantially receive display unit 220 within enclosure 210. Enclosure 210 may be coupled to display unit 220 through a ball and socket joint. In the embodiment of FIGS. 1-4, cavity 215 comprises sockets 217A, 217B. Sockets 217A, 217B may be shaped to receive ball portions 224A, 224B that are formed on opposed sides of display unit 220 to effectively form a ball and socket joint. The ball and socket joint allows for relative movement between display unit 220 and enclosure 210 such that a user can adjust the angle and position of display unit 220 to a user's preferred position or to provide a better viewing angle. In particular, the ball and socket joint may allow display unit 220 to pivot relative to enclosure 210 as ball portions 224A and 224B are rotated within sockets 217A, 217B. In other embodiments the ball and socket joint may be formed in other ways. For example, in some embodiments, ball portions similar to portions 224A and 224B may be formed on interior surfaces of shell 214 of enclosure 210, and sockets similar to sockets 217A and 217B may be formed on opposed sides of display unit 220.

Figure 5B:
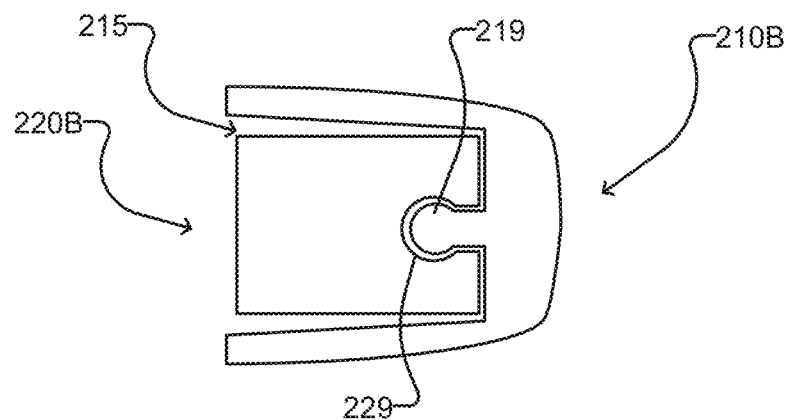
FIG. 5B is a sectional view of a display unit and enclosure according to another example embodiment.

FIGS. 5A and 5B show two other example embodiments with ball and socket joints. In FIG. 5A, enclosure 210A defines a socket 218 in a forward portion thereof, and display unit 220A comprises a ball portion 228 extending forwardly therefrom. In FIG. 5B, enclosure 210B comprises a ball portion 219 extending rearwardly from a forward portion thereof, and display unit 220B defines a socket 229 in a forward portion thereof.

Cavity 215 allows display unit 220 to be nested within enclosure 210. As a result, at least a portion of display unit 220 may be positioned outside of a surface of lens assembly 120 (i.e. further from a user than lens assembly 120). This provides for additional space between a user's face and the display of display unit 220, which provides for easier focusing on the display by a user. The additional space also may reduce any interference of the HUD system 200 with the ordinary activities of a user. Further, nesting display unit 220 within enclosure 210 may allow for a larger display and/or larger processors or drivers (and therefore faster processing of information) within display unit 220.

The positioning of the display and display unit 220 within or near lens assembly 120 allows a user to view the displayed information merely by moving their eyes. This may reduce the dangers inherent in, for example, a wrist based display where the user must either tilt their head down or raise their wrist to be able to view any displayed information. Such actions may be dangerous while in the midst of performing physical activities such as skiing, snowboarding, motorcycling or bicycling. Other embodiments may provide HUD systems wherein portions thereof may be located outside the frame to which the HUD system attaches.

As best seen in FIG. 2, compartment 230 may be attached to strap 130 by coupling a support plate 234 to a body 232 of compartment 230 through strap 130 by way of screws 233. Body 232 and support plate 234 may additionally or alternatively be attached to strap 130 by way of rivets, snaps, clips or the like. In other embodiments, compartment 230 may comprise a slot or aperture (not shown) shaped to engage strap 130. Strap 130 may be disengaged from frame 110 at attachment point 132A (for example) and passed through a slot or aperture in compartment 230. Strap 130 may then be re-engaged with frame 110 at attachment point 132A.

Compartment 230 may be coupled to display unit 220 by means of a cable 236. Cable 236 may comprise a connector 237 configured to be removably received in a corresponding connecting feature of body 232 of compartment 230. Body 232 may also have one or more communication ports 238 and a power button 239 thereon. Ports 238 may be used to connect the electronic system housed in compartment 230 with other systems. Power button 239 may be used to turn the electronic system housed in compartment on and off. Ports 238 may be covered by a suitable flap or other protective structure to prevent moisture and debris from contacting ports 238. Cable 236 may supply a power and/or information connection between compartment 230 (and its associated sensor unit, processor unit and/or power unit) and display unit 220. In some embodiments, an opening 136 may be formed in strap 130 to permit cable 236 to pass therethough. Cable 236 may pass through frame 110 of goggles 100 in some embodiments. In some embodiments cable 236 is a spiral cable which can be extended to different lengths to accommodate use with a variety of sizes of goggles. In other embodiments cable 236 may be straight, wavy, wound around a retractable cable dispenser or the like. In some embodiments, cable 236 may pass through a ventilation system of frame 110.

In some embodiments cable 236 may be omitted and compartment 230 may be wirelessly connected with display unit 220. For example, information may be transferred by way of radio or other electromagnetic waves using wireless connections as known in the art. Power may also be transmitted wirelessly in some embodiments through, for example, non-radiative electromagnetic fields as described in Karalis et al., "Efficient wireless non-radiative mid-range energy transfer" Annals of Physics 323 (2008) 34-48 (http://www.mit.edu/~soljacic/wireless power AoP.pdf).

Figure 6:
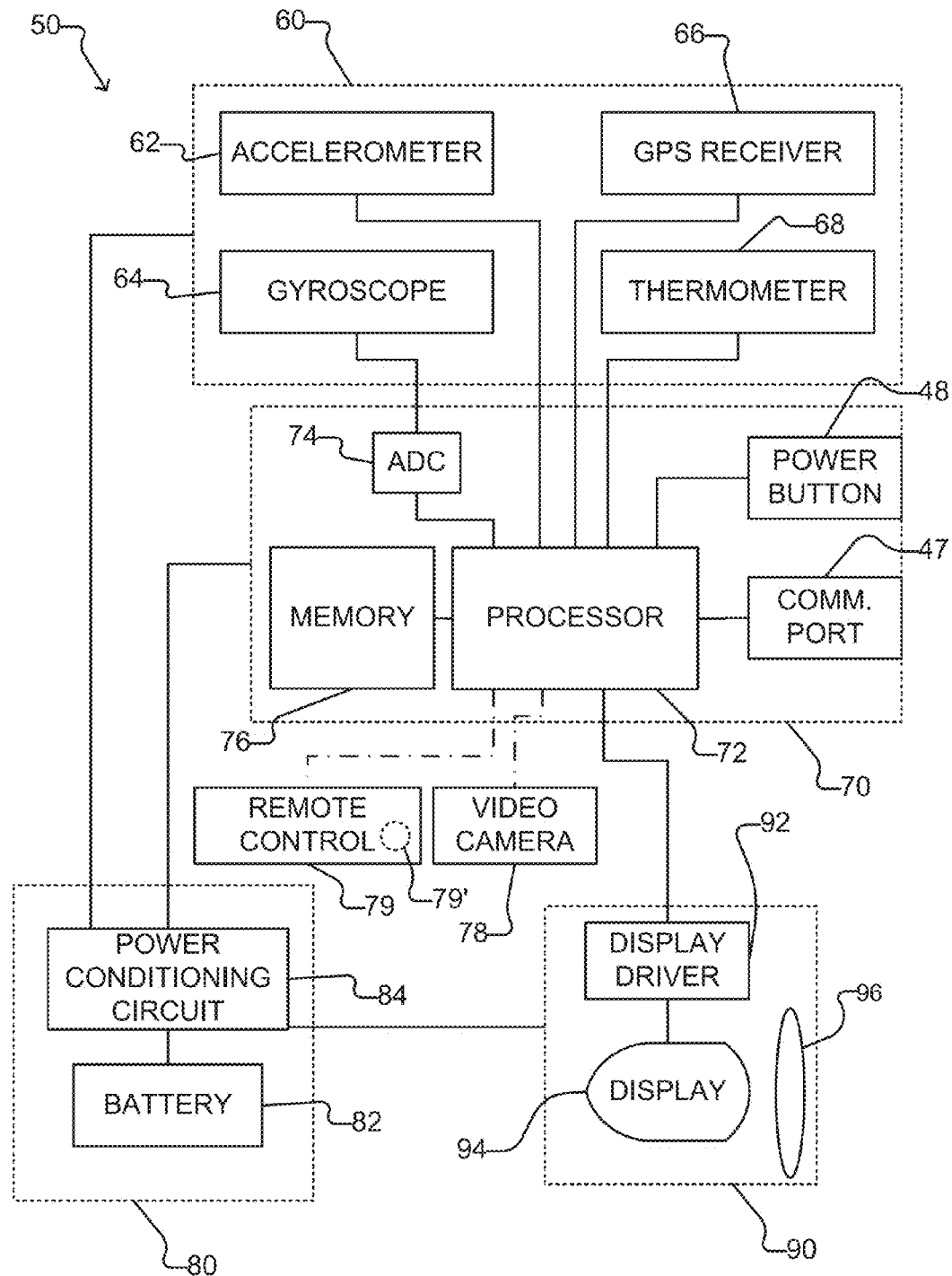
FIG. 6 is a schematic diagram of an electronic system of a modular HUD system according to an example embodiment.

FIG. 6 shows an example embodiment of an electronic system 50 suitable for use with a modular HUD system as described above. Electronic system 50 comprises sensor unit 60, processor unit 70, power unit 80 and display unit 90. With reference to the example HUD system 200 described above, sensor unit 60, processor unit 70 and power unit 80 may, for example, be substantially contained in compartment 230, and display unit 90 may, for example, be substantially equivalent to display unit 220 and/or substantially contained in optic enclosure 210.

In the illustrated embodiment, sensor unit 60 comprises a 3-axis accelerometer 62, a 3-axis gyroscope 64, a GPS receiver 66, and a thermometer 68. Accelerometer 62 and gyroscope 64 are collectively referred to herein as "INS" (inertial navigation system) sensors. The INS sensors 62, 64 and GPS receiver 66 have complementary strengths and weaknesses such that their combined use provides for improved reliability and accuracy of measurement of position and altitude as compared to each sensor on its own.

Accelerometer 62 may comprise, for example, a micro-electro-mechanical system (MEMS) device which produces digital output signals representative of linear accelerations along three perpendicular axes. In some embodiments, accelerometer 62 may comprise a LIS331DL motion sensor manufactured by STMicroelectonics.

Gyroscope 64 may comprise, for example, two MEMS devices, one of which produces analog output signals representative of angular velocities about two perpendicular axes, and one of which produces an analog output signal about a third axis perpendicular to the other two axes. In some embodiments, gyroscope 64 may comprise an IDG-500 for measuring angular velocities about an x-axis and a y-axis, and an ISZ-500 for measuring angular velocity about a z-axis, both of which are manufactured by InvenSense, Inc.

GPS receiver 66 may comprise, for example a Wide Area Augmentation System (WAAS) enabled GPS receiver with a built-in system clock. GPS receiver 66 may, for example, output digital signals using a protocol such as NMEA 0183 or NMEA 2000. Thermometer 68 may comprise, for example, a digital thermometer.

In other embodiments, sensor unit 60 may comprise some combination of one or more sensors described above or other sensors such as 3G signal receivers, wireless internet receivers, audio radio receivers, television or video receivers or the like.

Processor unit 70 comprises a processor 72 which, in the illustrated embodiment, is connected to receive signals from accelerometer 62, gyroscope 64, GPS receiver 66 and thermometer 68 of sensor unit 60. Processor unit 70 may comprise an analog-to-digital converter (ADC) 74 connected between processor 72 and any of the sensors of sensor unit 60 which produce analog signals. In the illustrated embodiment, all sensors of sensor unit 60 except gyroscope 64 have digital outputs, so ADC 64 is connected only between gyroscope 64 and processor 62.

In the illustrated embodiment, processor unit 70 also comprises a memory 76. Memory 76 may comprise volatile and/or non volatile memory such as RAM, ROM, or other types of memory. Memory 76 may also comprise a removable media such as a USB drive, SD or miniSD card, etc. Memory 76 has stored therein various computer readable instructions for use by processor 72. In other embodiments, memory 76 may be integrated into processor 72.

Processor 72 may also be coupled to communications port 47 and power button 48. Communications port 47 may be accessible to a user and comprise one or more interfaces for wired or wireless communication with external devices. Communications port 47 may, for example, comprise one or more USB, Firewire, or other interfaces. Power button 48 may also be accessible to the user and operable to turn electronic system 50 on and off.

Processor unit 70 may also send and receive information from other devices such as mobile phones, personal computers, other modular HUD systems, etc. For example, processor 72 may receive images or video from a video camera 78 and send the same via an appropriate communications method. For example, in some embodiments processor 72 may control display 94 to act as a viewfinder for video camera 78 by displaying live images from video camera 78. Display of live images from camera 78 on display 94 may facilitate users capturing of intended scenes by providing feedback to users as to where camera 78 is pointing. Processor 72 may also cause display 94 to display stored images captured with video camera 78. Video camera 78 may be configured to capture both still and moving images in some embodiments. Video camera 78 may be physically connected to electronic system 50 or may be wirelessly connected through a Bluetooth communication protocol or other suitable communications methods. Processor 72 may also receive input commands from a remote control 79. Remote control 79 may be wirelessly connected to processor unit 70 and may comprise a wireless watch-type remote or be integrated into a user's gloves or mitts for example. Remote control 79 may also be integrated into video camera 78.

In some embodiments, remote control 79 may include a thermometer 79', and remote control 79 may be configured to transmit temperature readings taken by thermometer 79' to processor unit 70. Providing temperature readings taken by thermometer 79' in remote control 79 may provide for simplified temperature calibration in some embodiments, since remote control 79 may not be susceptible to as many thermal disturbances as thermometer 68 of sensor unit 60, which is typically located close to the user's head and may be covered by a hat or other articles. Providing thermometer 79' in remote control 79 may thus improve the accuracy of temperature readings in some embodiments. In some embodiments, thermometer 79' may be used in conjunction with thermometer 68 of sensor unit 60. In some embodiments, thermometer 68 of sensor unit 60 may be omitted, and thermometer 79' may provide the only temperature readings to processor unit 70.

Processor 72 is configured to transform signals received from sensor unit 60 to produce outputs representing various parameters relating to user performance, and other outputs. For example, processor 72 may produce outputs relating to one or more of position, orientation, time, speed, direction of travel, altitude, vertical drop, jump airtime, jump distance, spins, etc. Processor 72 may store the outputs and/or any other data in memory 76. Processor 72 may also produce a video signal to be displayed by display unit 90. In some embodiments, the video signal produced by processor 72 for displaying on display 90 comprises one or more of: an instantaneous speed indication; an average speed indication; a position indication; an orientation indication; a direction of travel indication; an altitude indication; a vertical drop indication; a jump airtime indication; a jump distance indication; a jump rotation indication; other motion indications; live or stored images from a camera (such as camera 78 or another camera); communication indications (e.g., text messages, emails, call indications, voicemail indications, etc.); and, other visual indications.

In this example embodiment, power unit 80 comprises a battery 82 and a power conditioning circuit 84. Power conditioning circuit 84 receives electrical power from battery 82 and outputs electrical power at voltages and/or currents suitable for the various components of sensor unit 60, processor unit 70, and display unit 90. In some embodiments, power conditioning circuit 84 may comprise temperature control elements and short circuit protection elements contained in compartment 230. In some embodiments, power conditioning circuit 84 may comprise power management elements contained in compartment 230.

Display unit 90 may comprise a display driver 92 to receive the video signal from processor 72. Display driver 92 is configured to generate driving signals based on the video signal, and to provide the driving signals to a display 94 as described above. In some embodiments, display driver 92 is contained in display unit 90. In some embodiments, display driver 92 may be directly connected or connectable to receive video signals from camera 78. In some embodiments, the electronic system 50 may also comprise a glance detector system, as described further below. The glance detector may, for example, be integrated with the display unit 90.

Display 94 may comprise, for example, a Quarter Video Graphics Array (QVGA) having a 320×240 resolution and 16 bit colors. In some embodiments, display 94 may comprise, a micro LCD illuminated by a suitable backlight. A lens assembly 96 may be positioned to magnify the image displayed on the display 94 and to improve the visibility thereof by the user.

In other embodiments, other types of displays may be used, such as, for example, LED or OLED displays, electroluminescent (EL) displays, or the like. In some embodiments, a projector may be configured to project information to be displayed onto the goggles lens. The projector may, for example, be positioned to project information to be displayed onto a portion of the goggles lens near the edge of the user's field of view.

In the example embodiment of FIGS. 1 to 4, display driver 92 and display 94 may contained within display unit 220, while sensor unit 60, processor unit 70 and power unit 80 may be contained within compartment 230. In other embodiments components may be located in other locations. For example, sensor unit 60 and/or processor unit 70, or portions thereof may be located within display unit 220 in some embodiments.

Other embodiments may provide HUD systems with variations of the features described above and/or different features from those described above. Such variations and/or different features may be used in the alternative to or in addition to the features described above, or with each other in different combinations and permutations than the example embodiments discussed herein.

Figure 7B:
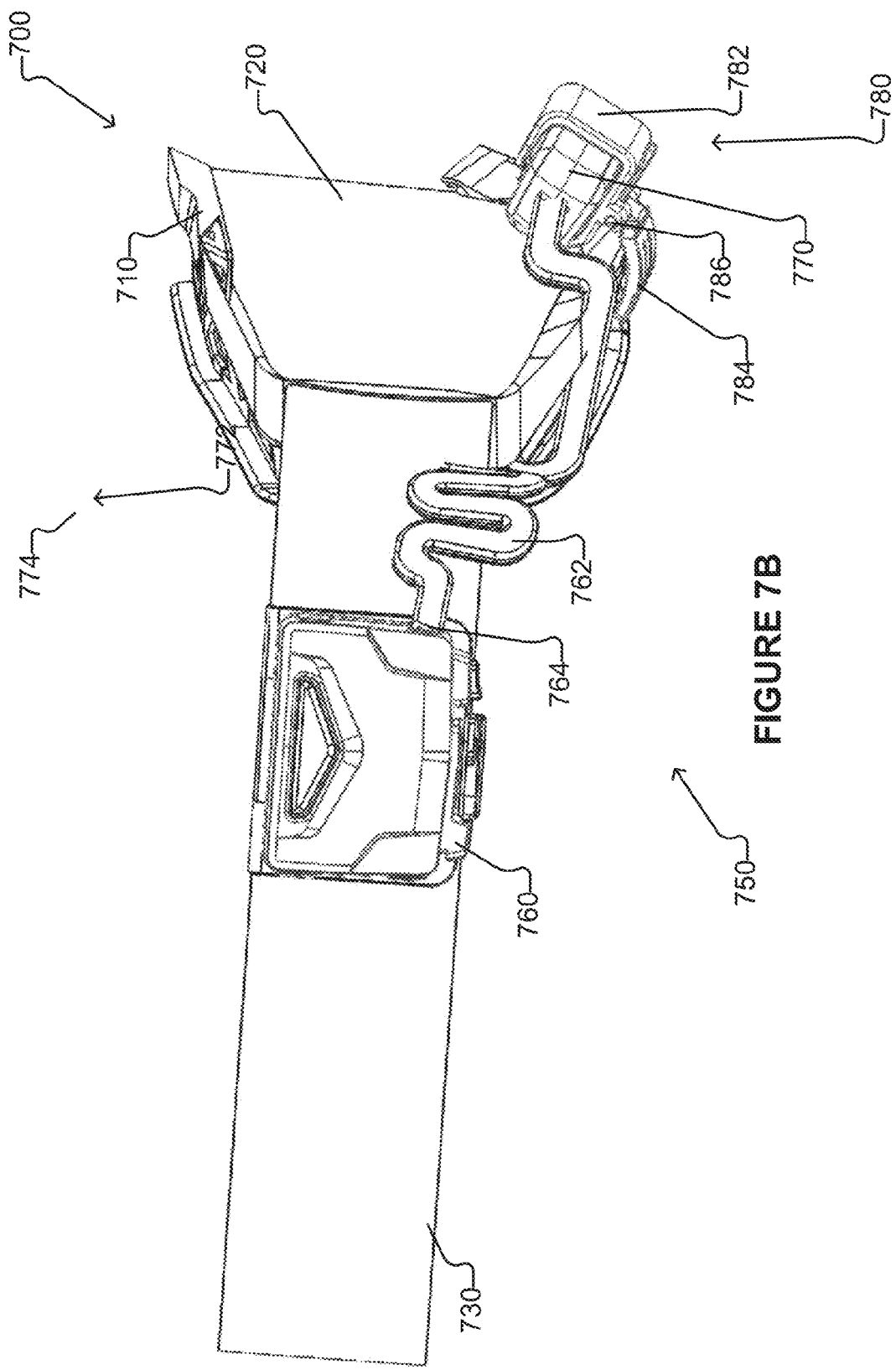
FIG. 7B is a side view of the goggles of FIG. 7A.

FIGS. 7A and 7B show an example of a pair of goggles 700 with a HUD system 750 according to another embodiment. Goggles 700 may comprise a conventional pair of goggles having a frame 710, a lens assembly 720 and a strap 730. HUD system 750 comprises a compartment 760 (which may be substantially similar to compartment 230 described above) coupled to strap 730. Compartment 760 is coupled to a display unit 770 by a cable 762 which may be removably connected to compartment 760 by a connector 764. Display unit 770 is coupled to frame 710 by a display mount in the form of a clip assembly 780. Clip assembly 780 may, for example, be configured to engage a lower portion of frame 710. In the illustrated example, clip assembly 780 comprises a bracket 782 configured to receive display unit 770. Display unit 770 may, for example, be adjustably received in bracket 782 to provide one or two degrees of freedom for adjustment of display unit 770. For example, in some embodiments display unit 770 is pivotally coupled to bracket 782. In some embodiments, display unit 770 may be coupled to bracket 782 by a ball and socket joint similar to the examples discussed above. Clip assembly 780 also comprises a thin portion (not shown) extending downwardly form bracket 782 and configured to fit between frame 710 and lens assembly 720. Clip assembly 780 also comprises a clamp assembly 784 pivotally coupled to bracket 782 by a pin 786. Clamp assembly 784 is configured to be rotated about pin 786 to engage the underside of the bottom portion of frame 710 when bracket 782 is in place. In some embodiments clamp assembly 784 is configured to make a snap-fit connection with the underside of the bottom portion of frame 710.

Figure 8:
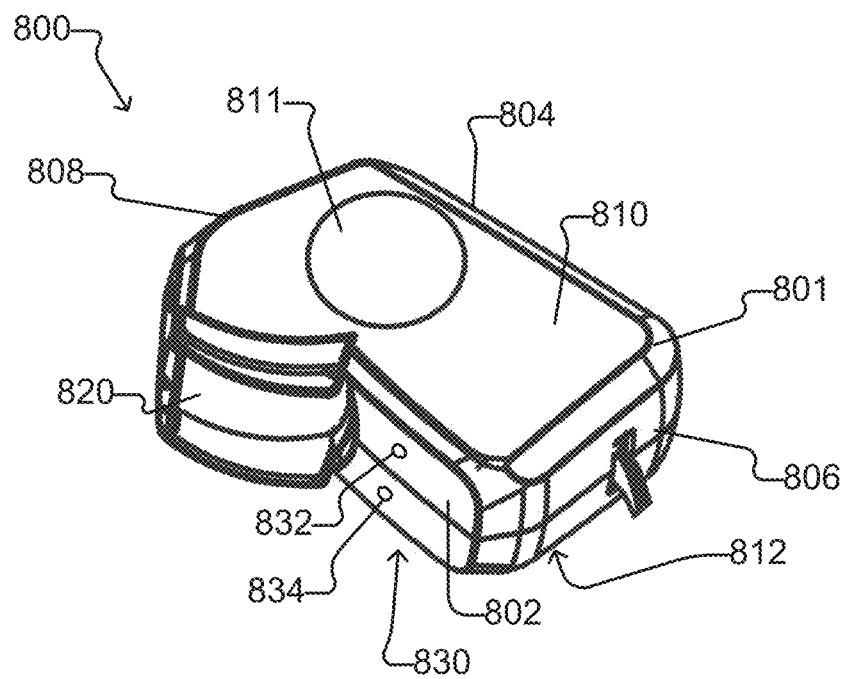
FIG. 8 is a perspective view of a display unit of a HUD system including a glance detector according to another example embodiment.

FIG. 8 shows an example of a display unit 800 according to another embodiment. Display unit 800 comprises a housing 801 which contains a display driver (not shown) and a display 820. Display unit 800 may be substantially similar to display unit 220 described above, except that display unit 800 comprises a glance detector 830 (which may also be referred to as a "gaze detector") configured to detect when a user looks at display 820. Glance detector 830 may be operatively coupled to the display driver and configured to provide a signal to the display driver indicative of whether or not the user is looking at display 820, and the display driver may be configured to maintain display 820 in an off state or a power saving state unless the user is looking at display 820. In the illustrated embodiment, glance detector 830 comprises a light source 832 (such as, for example, an infrared transmitter) and a light detector 834 (such as, for example, an infrared receiver 834) operatively coupled to processing elements (e.g., such as, for example, processor 72 discussed above or other processing elements). The light source 832 emits infrared light which reflects off of a user's eye and is received by the light detector 834. Through appropriate calibration, the processing elements of glance detector 830 may determine from the reflected infrared or other light received at detector 834 whether or not the user is looking at display 820. In other embodiments, a glance detector may comprise one or more brightness sensors configured to capture ambient light reflecting off of a user's eye to determine whether or not the user is looking at display 820. In still further embodiments, a glance detector may comprise a miniature CCD positioned to capture images of the user's eye and imaging processing elements configured to analyze the captured images to determine whether or not the user is looking at display 820.

Housing 801 may be made of any suitable rigid material, such as High Density Polyethylene (HDPE), Poly Vinyl Chloride (PVC), or high density rubber. Housing 801 may be any suitable shape. For example, the housing 801 may be generally rectangular or oval shaped. Optionally, the housing 801 may be aerodynamically shaped to reduce or minimize wind resistance when the display unit 800 is positioned on a head-mounted device. The housing 801 is permanently or removably attachable to a head-mounted device utilizing any suitable attachment mechanism. In some embodiments, such as the example shown in FIG. 8, the housing 801 is configured to be received in an enclosure coupled to a pair of goggles or other headgear, as described above with reference to FIGS. 1-7. In other embodiments, the glance detector 830 may be used in association with a housing configured to be received by a display mount as described below with reference to FIGS. 9-18.

In the example shown in FIG. 8, housing 801 includes a front 802, a back 804, two opposing sidewalls 806, 808 that extend between the front 802 and the back 804 of the housing 801, a top 810 and a bottom 812. The top 810 and bottom 812 may have mounting features 811 to facilitate adjustable coupling to an enclosure, as described above. The front 802 of the housing 801 frames a lens assembly of the display 820. The front 802 of the housing 801 also frames the light source 832 and the light detector 834. In some embodiments the light source 832 and the light detector 834 may not be visible to a user. For example, the light source 832 and the light detector 834 may be covered with a material that is opaque to light in the visible spectrum but transparent to IR light.

Figure 8A:
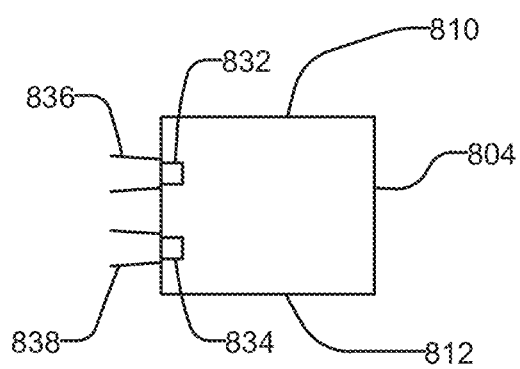
FIG. 8A is a side view of an example display unit with a glance detector.

Optionally, the front 802 of the housing 801 may include one or more hoods or baffles (not shown in FIG. 8, see FIG. 8A) for blocking ambient light from the light detector 834, and/or for preventing "crosstalk" between the light source 832 and the light detector 834 (e.g., to prevent light from the light source 832 which is reflected or scattered off an object other than the user's eye from reaching the light detector 834). FIG. 8A schematically illustrates a side view of the housing 801 with baffles 836 and 838 respectively positioned about the light source 832 and the light detector 834. The baffles 836 and 838 may reduce crosstalk between the light source 832 and the light detector 834, as discussed above, particularly in implementations where the display unit 800 is located outside of a primary lens of the goggles or glasses to which the heads-up display system is mounted (e.g., in the case of a pair of glasses, the baffles 836 and 838 may be positioned against the glasses lens when the display unit 800 is in place on the glasses). The baffles 836 and 838 may also be used to limit the illumination cone of light from the light source 836 and the detection cone of the light detector 838.

In some embodiments, the housing 801 (and/or baffles 836 and 838) may be constructed from a material which blocks IR and/or ultraviolet (UV) light. In some embodiments, the housing 801 may be coupled to a pair of goggles (or other headgear or eyewear, such as for example, a helmet, glasses, etc.) on the inside of the goggle lens, and the goggle lens may provide IR and/or UV blocking. The housing 801 may be positioned such that the display unit 800 does not interfere with a user's field of view and the user may view information and/or images displayed by the display unit 80 by merely moving their eyes. Further details of example glance detectors and associated methods, apparatus and systems for controlling display 820 based on where the user is looking are described below, with reference to FIGS. 19-22.

FIG. 9 shows a pair of goggles with a HUD system 900 according to another embodiment. The goggles and HUD system 900 of FIG. 9 may be substantially similar to goggles 100 and HUD system 200 described above (and thus will not be described again), except that system 900 comprises a camera 910 mounted on compartment 230. Camera 910 may be adjustably attached to compartment 230 to allow panning and tilting, as indicated by arrows 912.

Figure 10:
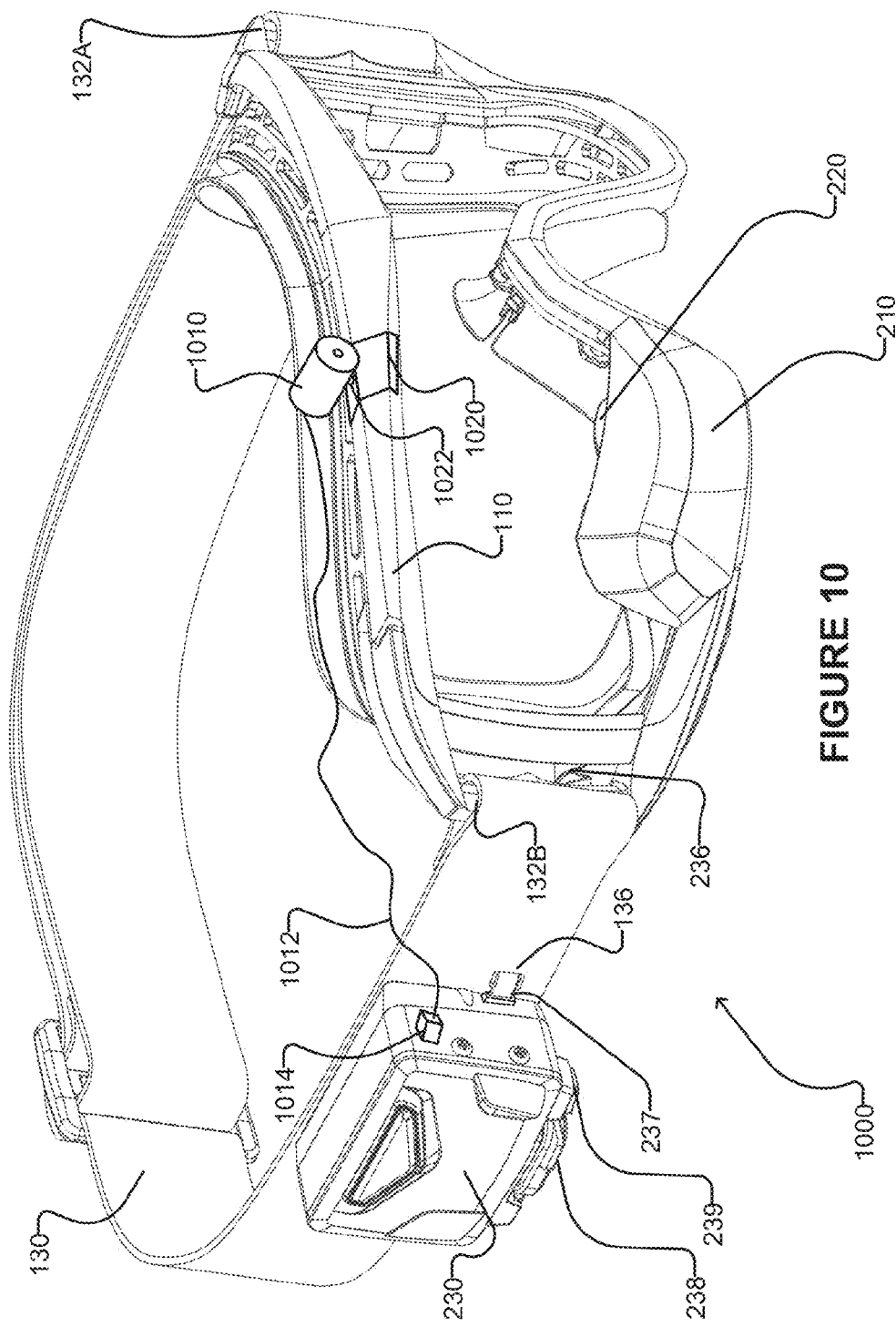
FIG. 10 is a perspective view of a pair of goggles with a modular HUD system according to another example embodiment.

FIG. 10 shows a pair of goggles with a HUD system 1000 according to another embodiment. The goggles and HUD system 1000 of FIG. 10 may be substantially similar to goggles 100 and HUD system 200 described above (and thus will not be described again), except that system 1000 comprises a camera 1010 mounted on a clip 1020 configured to attach to an upper portion of frame 110. Camera 1010 may be attached to compartment clip 1020 by an adjustable mounting element 1022 to allow panning and tilting of camera 1010. Camera 1010 may be operatively coupled to the electronic system in compartment 230 by a cable 1012 with a connector 1014 configured to be removably coupled to compartment 230.

FIG. 11 shows a pair of goggles 1100 with a HUD system 1200 according to another embodiment. FIG. 11A shows an exploded view of the components of HUD system 1200. Goggles 1100 include a frame 1110, a lens assembly 1120 and a strap 1130. The goggles 1100 of the FIG. 11 embodiment may, for example, be any type of conventional goggles. HUD system comprises a display mount 1210, a display unit 1220 and an electronics compartment 1230. Display mount 1210 is adhesively attached to lens assembly 1120, and display unit 1220 is adjustably received in display mount 1210 as described further below.

Electronics compartment 1230 is attached to strap 1130 by a strap connector 1231 in the illustrated embodiment. The outer side of strap connector 1231 is best seen in FIG. 11A, and the inner side of strap connector 1231 is best seen in FIG. 11B. Strap connector 1231 comprises first and second protrusions 1232 and 1233 on the outer side thereof, and clips 1234 on the inner side thereof configured to engage strap 1130. The first protrusion 1232 has a tab configured to be inserted in a corresponding slot (not shown) in one end of electronics compartment 1230, and the second protrusion 1233 has a slot configured to receive a tab 1235 on the opposite end of electronics compartment 1230. It is to be understood that electronics compartment 1230 may be attached to strap 1130 by other mechanisms in other embodiments.

A cable 1236 operably connects electronics compartment 1230 to display unit 1220. Cable 1236 may comprise a connector 1237 configured to be removably received in a corresponding connecting feature of the body of electronics compartment 1230. Electronics compartment 1230 may also have one or more communication ports and a power button thereon (not shown), similar to compartment 230 described above with reference to the embodiment of FIGS. 1 and 2. In the illustrated embodiment, cable 1236 is a spiral cable which can be extended to different lengths to accommodate use with a variety of sizes of goggles. In other embodiments cable 1236 may be straight, wavy, wound around a retractable cable dispenser or the like.

Referring to FIGS. 12 through 14B, display mount 1210 comprises a front face 1212 configured to conform to the shape of lens assembly 1130. As used herein with reference to display mount 1210 and display unit 1220, the term "front" and related terms are used to refer to the direction closer to lens assembly 1130, and the term "rear" and related terms are used to refer to the opposite direction. The rear portion of display mount 1210 comprises a concavely-curved surface 1214 and side portions 1216 having slots (not specifically enumerated) therein adapted to adjustably receive display unit 1220, as described further below. The display mount has a viewing passage between the front and rear portions, and the viewing passage has an inner surface 1213 which is textured (e.g., with ridges as in the illustrated example) to reduce the amount of light reflected therefrom, thereby improving the visibility of images displayed on the display unit 1220. The bottom of display unit 1220 may have an optional cable clip 1228 thereon adapted to hold cable 1236.

The front face 1212 of display mount 1210 is configured to be adhesively coupled to lens assembly 1130. As shown in FIG. 12C, an adhesive sealing gasket 1211 may be provided for attaching display mount 1210 to lens assembly 1130. In some embodiments, gasket 1211 may comprise double sided tape such as, for example, 3M™ VHB™ tape. A grommet 1229 may be provided in the underside of display unit 1220, and sized to allow cable 1236 to pass therethrough to the interior of display unit 1220 and provide a seal around cable 1236.

As shown in FIG. 12D, display unit 1220 comprises upper and lower housing sections 1220A and 1220B which enclose a display driver 1292 and a display 1294, which may be substantially similar to display driver 92 and display 94 described above. A display lens assembly 1296 is positioned at the front of display unit 1220 between housing sections 1220A and 1220B and configured to magnify images on display 1294 for viewing by a user. The interfaces between housing sections 1220A and 1220B, display lens assembly 1296 and grommet 1229, as well as the seal between grommet 1229 and cable 1236 (not shown in FIG. 12D) are preferably water-tight to prevent moisture or other contaminants from getting inside display unit 1220.

As best seen in FIGS. 13A, 13B, 14A and 14B, the front of display unit 1220 comprises a convexly-curved surface 1224 shaped to conform to concavely-curved surface 1214 of display mount 1210. Surfaces 1214 and 1224 have generally spherical curvatures in some embodiments. A sealing gasket 1225 may be provided around surface 1224 to provide a seal between display unit 1220 and display mount 1210.

Figure 13A:
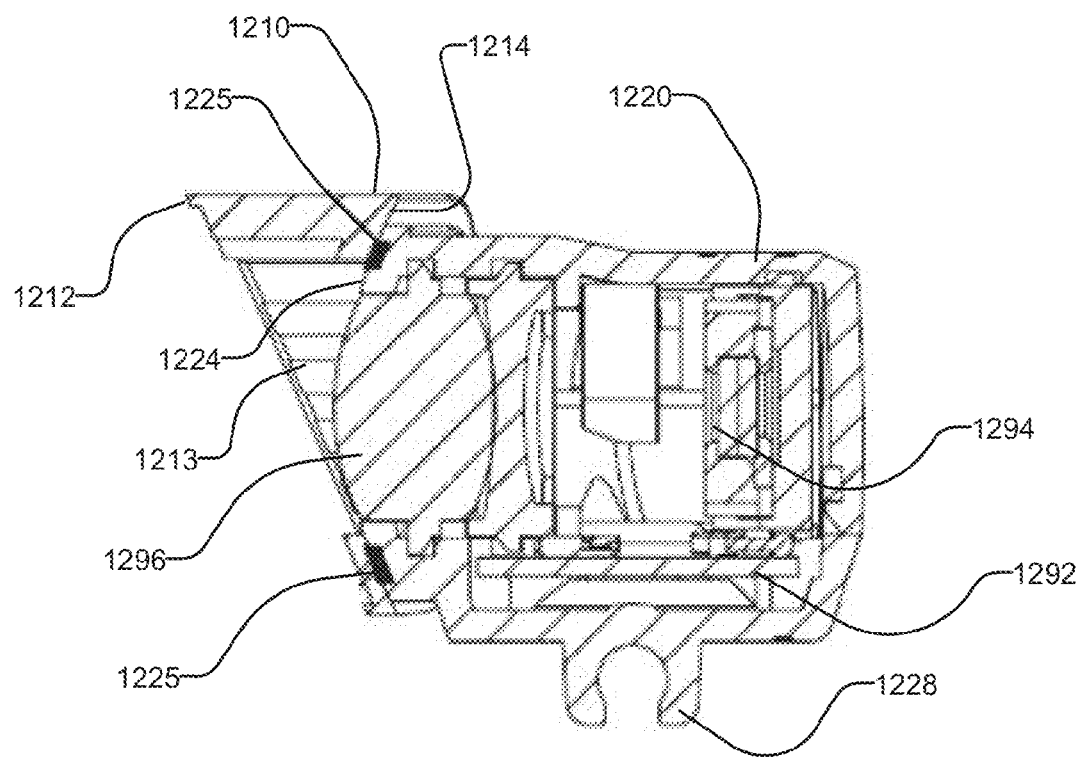
FIG. 13A is a sectional view taken along the line A-A in FIG. 12A.
Figure 13B:
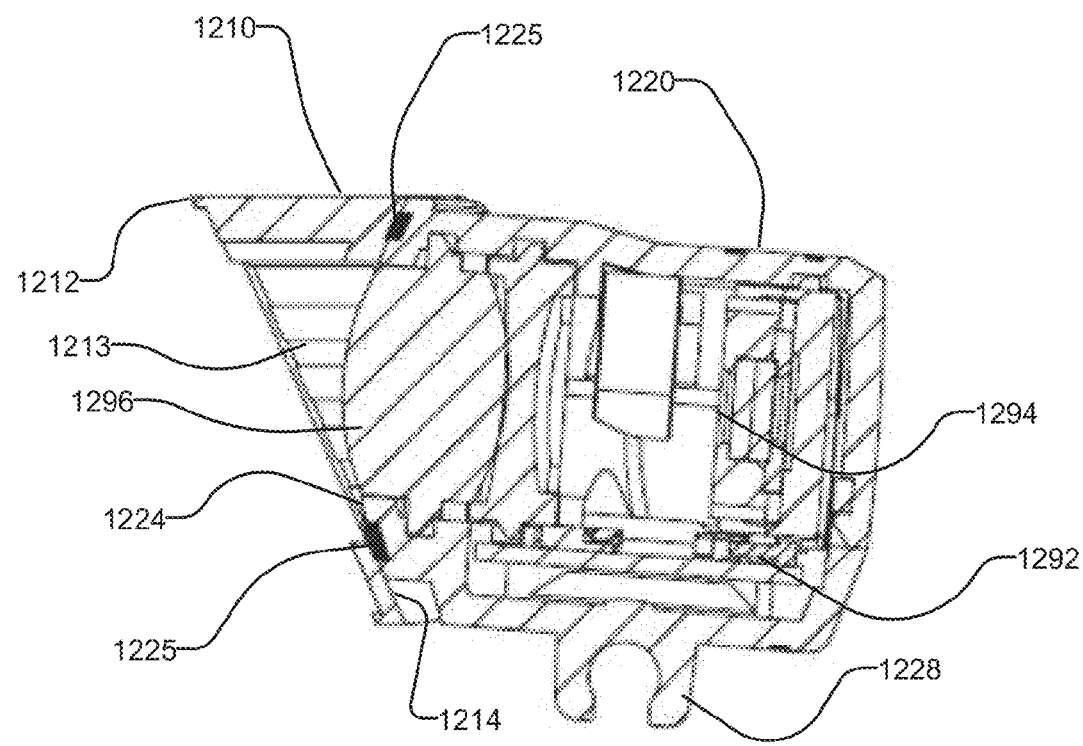
FIG. 13B shows the same view as FIG. 13A with the pitch angle of the display unit adjusted.
Figure 14A:
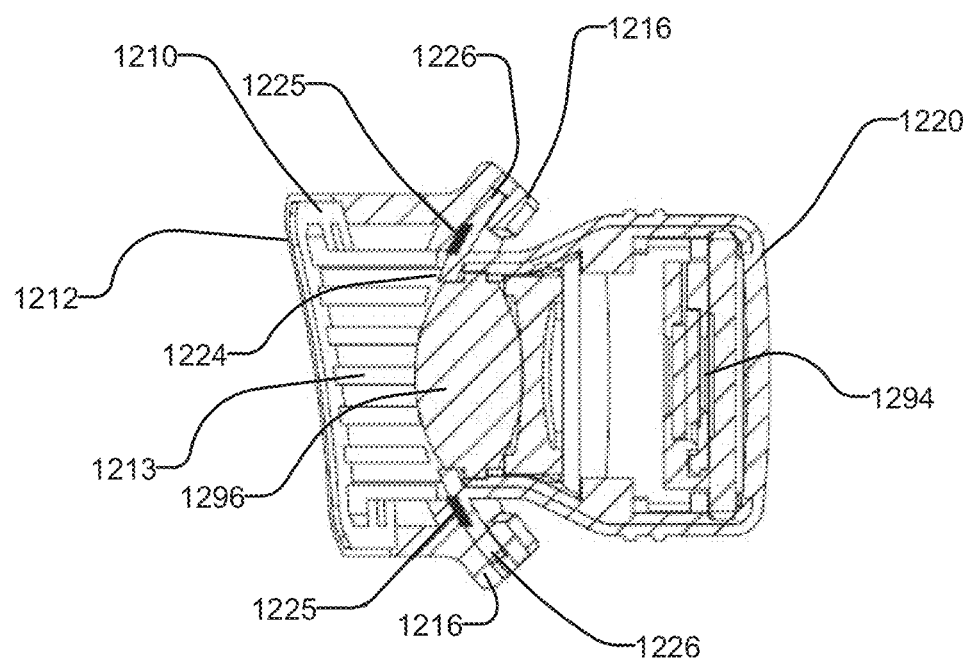
FIG. 14A is a sectional view taken along the line B-B in FIG. 12B.
Figure 14B:
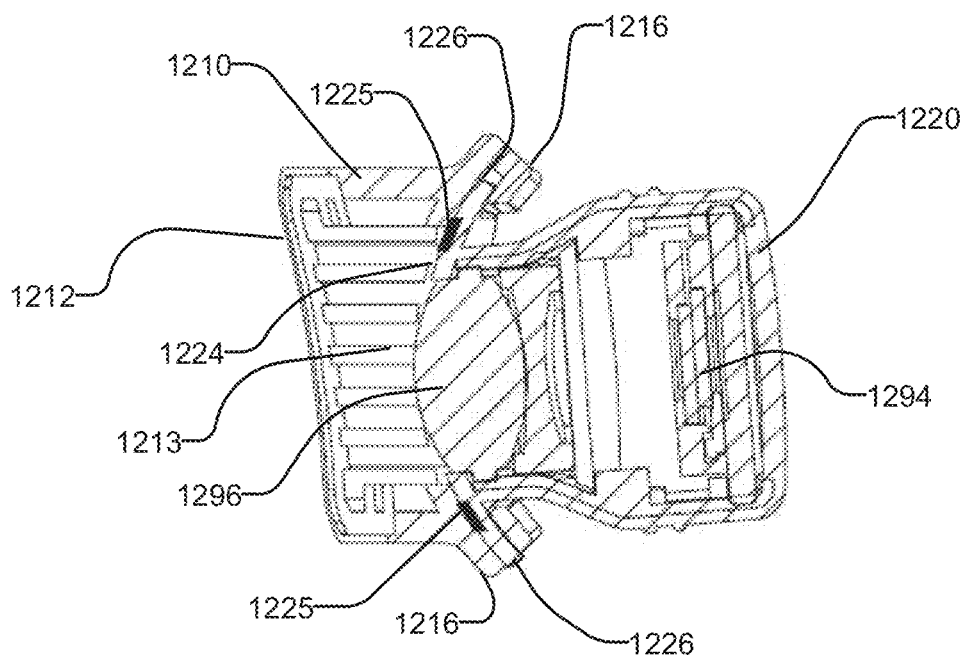
FIG. 14B shows the same view as FIG. 14A with the yaw angle of the display unit adjusted.

Display unit 1220 also has tabs 1226 extending outwardly from the sides of surface 1224 and sized to be received in slots in side portions 1216 of display mount 1210. In some embodiments, the tabs 1226 are held captive in the slots in the side portions 1216 of the display mount such that the display unit 1220 may not be removed from the display mount 1210. In some embodiments, the tabs 1226 may only be removed from the slots in the side portions 1216 of the display mount by using a key (not shown) or the like (e.g., by inserting the key to remove a portion of the side portions 1216 such that the display unit 1220 may be removed). The slots in side portions 1216 of display mount 1210 may be longer in the vertical direction than tabs 1226 to permit adjustment of the pitch angle of display unit 1220, as shown in FIGS. 13A and 13B. The distance between side portions 1216 is greater than a width of display unit 1220 rearward of tabs 1226 to permit adjustment of the yaw angle of display unit 1220, as shown in FIGS. 14A and 14B. In some embodiments, the angle of display unit 1220 relative to display mount 1210 may be adjusted by about 5 degrees left or right from a "nominal" position (e.g. the position as shown in FIGS. 13A and 14A), about 4 degrees downward from the nominal position and about 6 degrees upward from the nominal position. As one skilled in the art will appreciate, different available adjustment angles may be provided in other embodiments by changing the sizes and spacing side portions 1216 and the slots therein, tabs 1226 and/or the housing of display unit 1220.

Figure 15A:
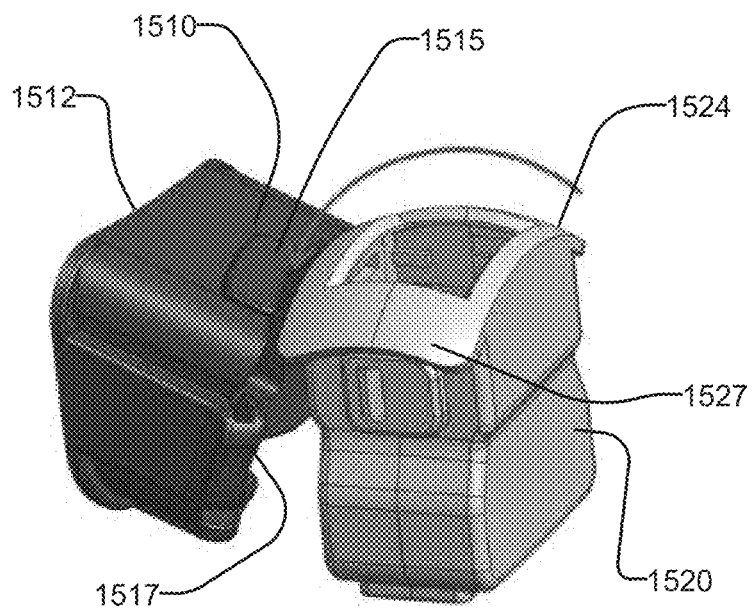
FIGS. 15A and 15B show a display unit and display mount according to another embodiment.
Figure 15B:
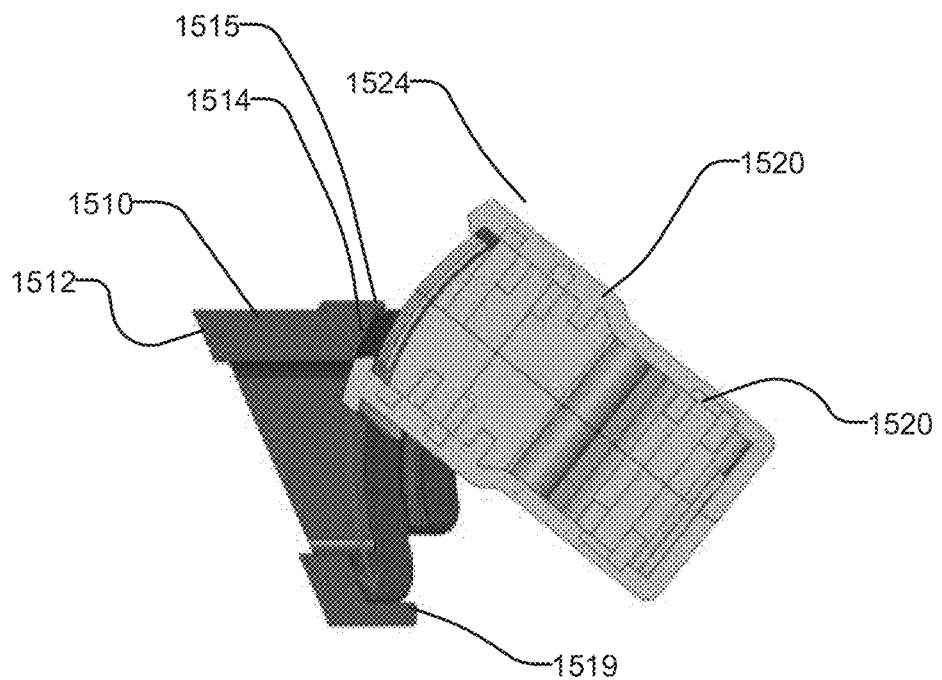

FIGS. 15A and 15B show a display mount 1510 and display unit 1520 according to another embodiment. Display mount 1510 and display unit 1520 are similar to display mount 1210 and display unit 1220 described above, except that the slots in side portions 1517 of display mount 1510 are open on the top and bottom, and tabs 1527 on display unit 1520 extend along substantially the entire length of each side of display unit 1520. Display mount 1510 comprises a catch 1515 near the top of surface 1514 for retaining display unit 1520 in display mount 1510. Catch 1515 may be somewhat flexible such that display unit 1520 may be removed from display mount 1510, but sufficiently rigid such that inadvertent removal is unlikely. Display mount 1510 also comprises a flange 1519 at the bottom portion thereof for preventing display unit 1520 from falling out of display mount 1510. Display unit 1520 may be inserted into display mount 1510 by aligning the bottoms of tabs 1527 with the tops of the slots in side portions 1517 then rotating the front of display unit 1520 downwardly as indicated by the arrow in FIGS. 15A and 15B.

FIGS. 16A through 16D show a display mount 1610 and display unit 1620 according to another embodiment. Display mount 1610 and display unit 1620 are similar to display mount 1210 and display unit 1220 described above, except that instead of having side portions with slots, display mount 1610 comprises a rearward extension 1613 having a socket portion 1615 thereon. Socket portion 1615 is configured to engage a corresponding ball portion 1625 on the rear of display unit 1620 to hold display unit 1620 in place and provide adjustability to display unit 1620.

Figures 17A, 17B:
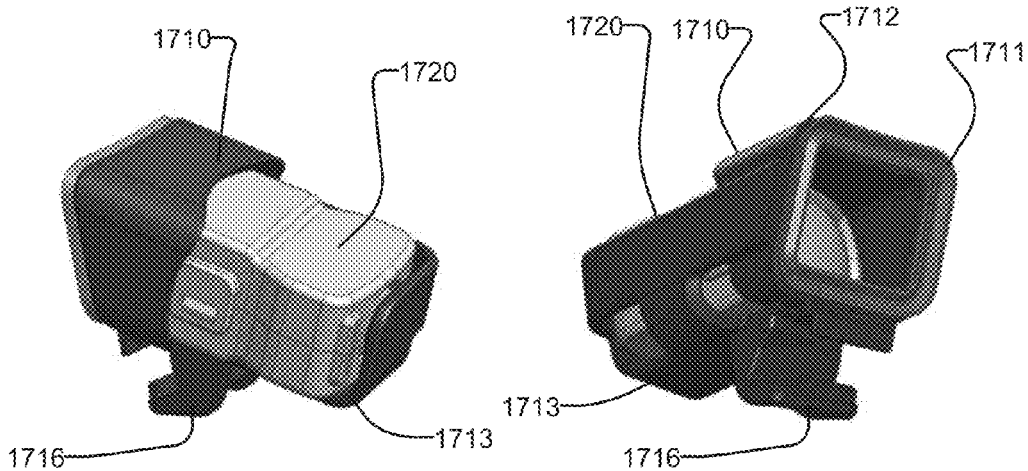
FIGS. 17A and 17D show a display unit and display mount according to another embodiment.
Figures 17C, 17D:
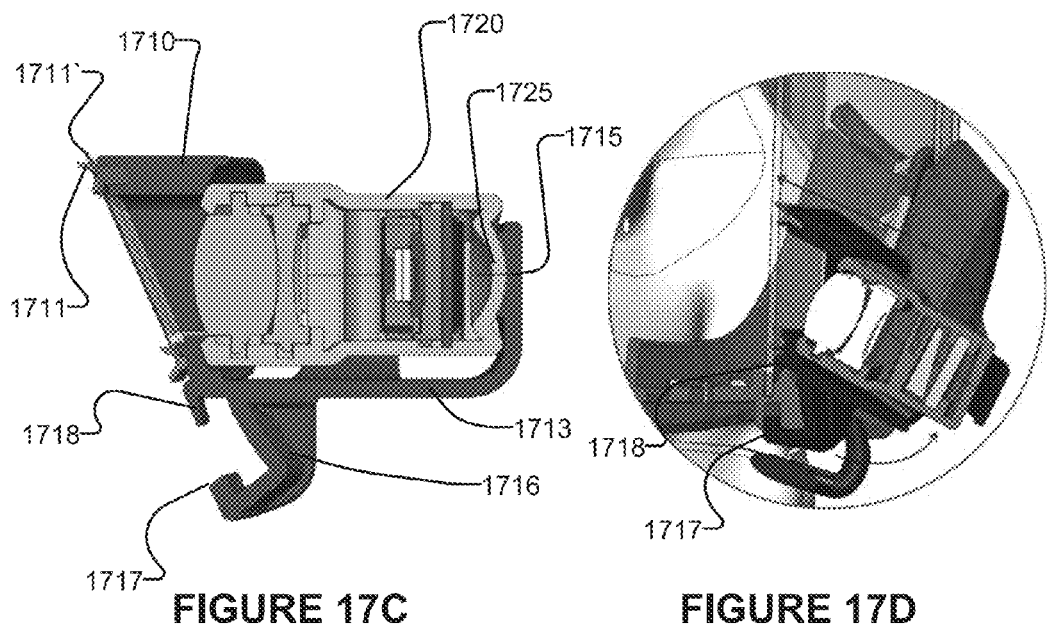

FIGS. 17A through 17D show a display mount 1710 and display unit 1720 according to another embodiment. Display mount 1710 and display unit 1720 are similar to display mount 1610 and display unit 1620 described above, except that instead of being adhesively coupled to the lens assembly of the goggles, display mount 1710 comprises a clip 1716 configured to engage a bottom portion of the frame of the goggles. Clip 1716 is shaped to conform to the profile of the goggles frame. Clip 1716 comprises a lower lip 1717 shaped to engage a notch (e.g. a ventilation notch) in the underside of bottom of the goggles frame, and an upper lip 1718 shaped to fit between the goggle lens and the upper portion of the bottom of the goggles frame, as shown in FIG. 17D. Display mount 1710 also comprises a deformable sealing gasket 1711, and display mount 1710 is configured such that when clip 1716 is engaged with the bottom of the goggles frame, gasket 1711 is deformed by the goggles lens to have a splayed configuration 1711' (see FIG. 17C), in order to provide an improved seal between gasket 1711 and the goggles lens. Other embodiments have combinations of features of the display mounts and display units described above. For example, any of the adhesively coupled display mounts of the embodiments of FIGS. 12 through 16D could be adapted to include a clip such as the clip 1716 of the embodiment of FIGS. 17A-D instead of being configured for adhesive coupling to the goggles lens.

Figure 18:
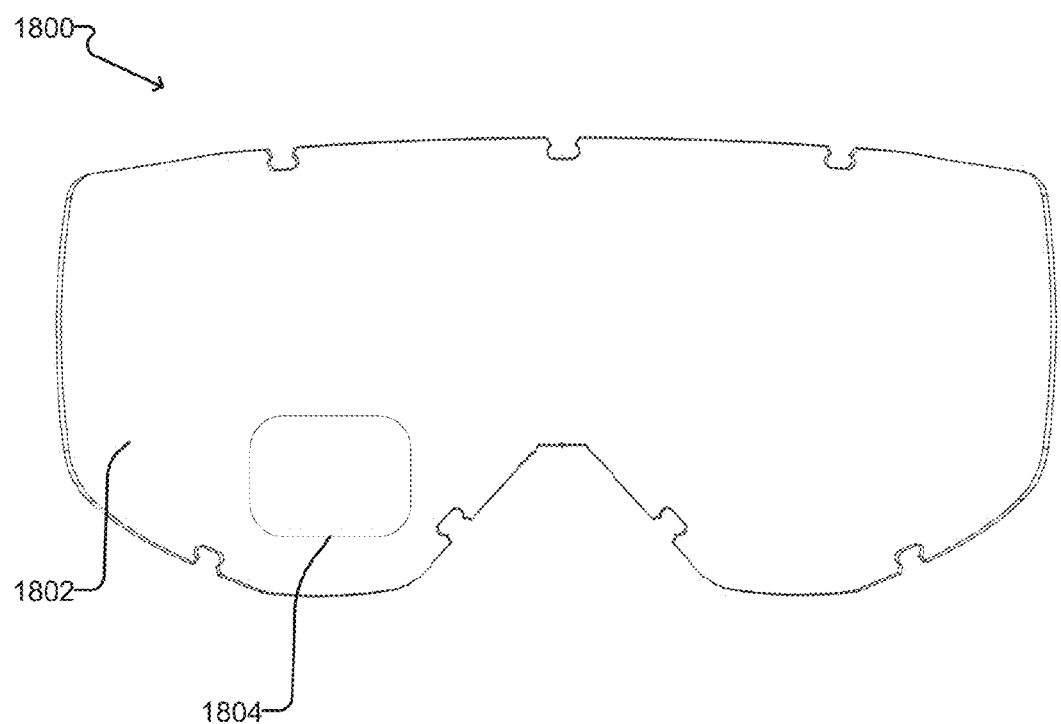
FIG. 18 shows an example template for facilitating attachment of a display mount.

FIG. 18 shows an example template 1800 for facilitating attachment of a display mount (not shown) such as those described above to the lens of a pair of goggles (not shown). Template 1800 comprises a sheet 1802 of material (e.g., paper, thin foam, plastic, or the like) sized and shaped to conform to a corresponding goggles lens profile. An opening 1804 in the sheet 1802 is provided at a predetermined position such that when the sheet 1802 is placed over the goggles lens, a user may attach the display mount to the goggles lens through the opening 1804. Template 1800 may be packaged together with goggles having the corresponding lens profile in some embodiments. Similar templates may be provided for visors of helmets. A plurality of templates, each having a different corresponding goggles lens, helmet visor, or other profile, may be packaged together with a HUD system as described above in some embodiments. For example, some embodiments may provide a kit comprising a HUD system, one or more templates, and materials (e.g. double sided tape) for attaching the display mount to a lens, visor or other transparent surface.

Figure 19:
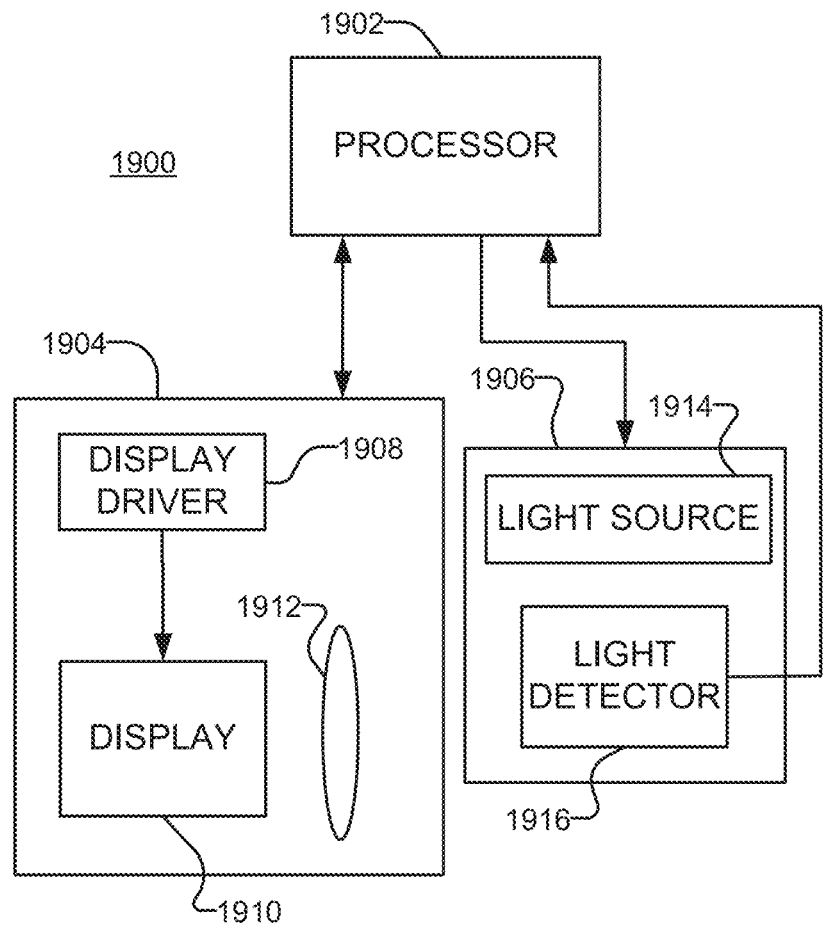
FIG. 19 is a block diagram of a display system including a glance detector for a head-mounted device or a heads-up display in accordance with the present disclosure.

FIG. 19 shows a block diagram of an example display system 1900 including a glance detector. The display system 1900 includes a processor 1902 coupled to a display unit 1904, and a glance detector 1906. The processor 1902 interacts with the display unit 1904, and the glance detector 1906. The display unit 1904 may comprise features of any of the example display units described above. The processor 1902 may, for example, be the same processor 72 described above which controls the operation of the overall electronic system 50, or may comprise separate processing elements dedicated to controlling the interaction of the glance detector 1906 and the display unit 1904. A power source (not shown), such as one or more rechargeable batteries, may be connected to the display system 1900 utilizing a wired or wireless connection, to power the display system 1900.

The display unit 1904 includes a display driver 1908, a display 1910, and a lens assembly 1912. The display driver 1908 is coupled to the processor 1902 to receive signals from the processor 1902. The display driver 1908 is also coupled to the display 1910 to provide drive signals for the display 1910 based on the signals received from the processor 1902. The display 1910 may be any suitable display for displaying information and/or images to a user, as discussed above. The display 1910 displays information and/or images, and the lens assembly 1912 enlarges and/or focuses the displayed information and/or image displayed by the display 1910 to facilitate viewing of the displayed information and/or images by a user when the display system 1900 is positioned on a head-mounted device or a heads-up display.

The glance detector 1906 includes a light source 1914 that is disposed near the display unit 1904. The light source 1914 emits light towards an eye of a user. The light source 1914 may be any suitable light transmission apparatus, such as an infrared (IR) light emitting diode, a near IR light emitting diode, or a low power IR laser. Preferably, the light source 1914 emits IR light having a wavelength in the range of 750 nm to 1400 nm. The light detector 1916 detects light that reflects from a pupil of the eye of the user and generates a voltage based on the amount of light detected by the light detector 1916. The light detector 1916 may be any suitable light receiving apparatus, such as an infrared photo-detector. The light source 1914 may emit light in a "cone" defined about a light source axis, as described further below. Likewise, the light detector 1916 may detect incoming light from a "cone" defined about a light detector axis, as described further below.

The light source 1914 and the light detector 1916 are disposed on or near the display unit 1904. For example, the light source 1914 and the light detector 1916 may be disposed on the lens assembly 1912, behind the lens assembly 1912 (e.g., such that the lens assembly 1912 is between the user's eye and the light source 1914 and the light detector 1916, in which case the lens assembly would be configured to convey IR light from the light source 1914 to the user's eye, and from the user's eye back to the light detector 1916) or may be disposed on a housing (not shown in FIG. 19) adjacent to the lens assembly 1912.

In some embodiments, the light source 1914 and the light detector 1916 are aligned with an optical axis of the lens assembly 1912. In such embodiments, the light source 1914 and the light detector 1916 may be configured so as to minimize interference with the user's viewing of an image on the display 1910. For example, in some embodiments the light source 1914 and/or the light detector 1916 may be sufficiently small to be substantially unperceived by the user, and/or may be positioned within the user's natural blind spot. Further, it is contemplated developments in transparent circuit technology could make transparent or substantially transparent IR light emitters and detectors available, which could thus be used as the light source 1914 and the light detector 1916 in the system 1900 described herein.

In some embodiments, the light source 1914 and the light detector 1916 are positioned near the lens assembly 1912 and each oriented such that their respective axes are at a small angle (e.g. less than about 15 degrees) to a "normal" of the display system 1900. As used herein, the term "normal" (N) refers to a vector that is perpendicular to an apparent image plane (PI,), as described further below with reference to FIG. 21, or a vector parallel thereto. In some embodiments, the light source 1914 and the light detector 1916 are angled slightly towards each other (for example, each by about eight degrees, such that the mutual angle between source 1914 and detector 1916 is about 16 degrees), as described further below with reference to FIG. 21A. Thus, the "cones" of the emission angle of the light from the light source 1914 and the detection angle of the light detector 1916 converge on the pupil of the eye of a user when the user is looking at the display 1910, as described further below with respect to FIG. 21B.

Figure 20:
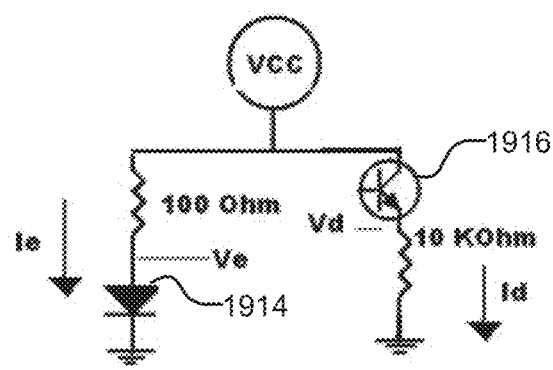
FIG. 20 is an example of a circuit diagram for a light source and a light detector of a glance detector.

Referring to FIG. 20, an example of a circuit diagram of the glance detector 1906 of FIG. 19 is shown. In the example shown in FIG. 20, the light source 1914 is an infrared light emitting diode (IRLED) and the light detector 1916 is an infrared (IR) sensitive transistor. The light source 1914 and the light detector 1916 are connected in parallel between a common voltage supply, VCC and a ground. A 100 Ohm resistor is connected between the voltage supply, VCC, and an anode of the IRLED. A 10 kOhm resistor is connected between an emitter of the IR sensitive transistor and the ground. A voltage is measured at Vd of the light detector 1916. In some embodiments, a voltage may also be measured at Ve as described further below.

The voltage at Vd may be measured, for example, by connecting Vd to an analog-to-digital converter (not shown). The analog-to-digital converter (ADC) may be coupled to or incorporated into the processor 1902. The voltage at Vd increases as more light is detected by the light detector 1916. In some embodiments, the light source 1914 may be controlled to emit pulses of light, as described further below with reference to FIG. 22. The light detector 1916 may be powered and the detected voltage may be sampled based on the pulse timing so that voltage is detected while light is being emitted. For example, the light detector 1916 may be powered and sampled at the middle of each pulse. Alternatively, the detected voltage may be sampled by the ADC at the end of the pulse, or at the three quarter point of the pulse. In some embodiments, the light detector 1916 is also powered while the light source 1914 off in order to take calibration readings of ambient conditions.

The processor 1902 may be configured to use pulse width modulation (PWM) to control the duty cycle and/or frequency of pulses of light emitted by the light source 1914. The duty cycle and frequency of the pulses of light emitted by the light source 1914 may be selected based on the response time of the light source. For example, in some embodiments, the pulses of light may have a duty cycle of at least 5% and a frequency of at least 5 Hz. In some embodiments, the pulses of light may have a duty cycle of at least 10% and a frequency of at least 10 Hz. In some embodiments, the pulses of light may have a duty cycle of at least 15% and a frequency of at least 20 Hz. In some embodiments, each pulse has a duration of approximately 0.01 s, although the pulse duration may vary based on the type of light source 1914. The frequency and duty cycle may be determined based on the rise and fall time of the emitter being used and/or the application and desired performance. The duration of each pulse of the PWM is preferably longer than the rise time. A higher frequency configuration will collect more data and be more responsive in general. For a given frequency the duty cycle should preferably be as low as possible (while still exceeding the rise time of the light source 1914) in order to minimize power consumption.

An example of operation of the display system 1900 will now be described with reference to FIGS. 19 and 20. The processor 1902 controls the light source 1914 to emit light from the display system 1900 toward a pupil of an eye of a user (not shown) when the display system 1900 is positioned on the user's head as part of a head-mounted device or a heads-up display. When the eye of a user of the display system 1900 is gazing at the display 1910 of the display system 1900, a relatively high proportion of the light that is emitted from the light source 1914 which is incident on the user's pupil passes through the pupil and reflects off inner eye surfaces back through the pupil, while a relatively high proportion of the light which is incident on the iris or sclera is absorbed. Light that reflects from the pupil of the eye of the receiver is detected by the light detector 1916, and the light detector 1916 generates a voltage (e.g. Vd) based on the amount of light detected. In the FIG. 20 embodiment, Vd increases as the amount of detected light increases, but by reversing the position of the light sensitive transistor and the 10 KOhm resistor shown in FIG. 20 Vd may decrease as the amount of detected light increases.

The processor 1902 receives a signal from the glance detector 1906 indicative of the voltage generated by the light detector 1916, and controls the display driver 1910 to turn-on the display 1912 based on the voltage generated by the light detector 1916. In some embodiments, the light detector 1916 is configured to detect light from the user's pupil when the user is looking at the display 1910 and the processor 1902 controls the display driver 1908 to turn-on the display 1910 when the voltage generated by the light detector 1916 is greater than a voltage threshold. The processor 1902 may also control the display driver 1908 to turn-off the display 1910 when the voltage generated by the light detector 1916 is less than the voltage threshold.

In other embodiments, the light detector 1916 is configured to detect light from the user's pupil when the user is looking away from the display 1910 and the processor 1902 may control the display driver 1910 to turn-on the display 1912 when the voltage generated by the light detector 1916 is less than a voltage threshold. The processor 1902 may also control the display driver 1910 to turn-off the display 1912 when the voltage by the light detector 1916 is greater than a voltage threshold. In some embodiments, the processor 1902 may control the display driver 1910 to maintain the display 1912 in a power saving state when the voltage generated by the light detector 1916 is greater than a voltage threshold.

In some embodiments, the voltage threshold is predetermined. In some embodiments, the voltage threshold is determined by the processor 1902 based on calibration data. The calibration data may be user-specific, and may be updated periodically and/or in response to changing operating conditions. In some embodiments, the voltage threshold is determined by the processor 1902 based on previously received voltage measurements, as discussed below.

The user specific calibration data may be determined by having a user of the display system 1900 to look away from the display 1910 for a predetermined period of time, and then look at the display 1910 for a predetermined period of time. This process of having a user look away from the display 1910 and look at the display 1910 may be repeated several times for an improved calibration. The display system 1900 determines voltage values when the user is looking away from the display 1910 and when the user is looking at the display 1910, and the processor 1902 defines threshold voltages based on the determined voltage values.

The calibration data that may be updated in response to changing operating conditions may be determined utilizing one or more ambient light sensors. The ambient light sensors may be included in the glance detector (not shown). The ambient light sensors (not shown) may receive ambient light that reflects from the pupil of the eye of a user of the display system 1900. The processor 1902 may use the received ambient light to calibrate the glance detector 1906. For example, the processor 1902 may receive a signal from the light detector 1916 indicative of a voltage generated by the light detector when ambient light is reflected from the pupil of the eye or other areas of a user of the display system 1900. The processor 1902 controls the light source 1914 to emit pulses of light from the light source 1914 towards the pupil of an eye of a user of the display system 1900. The processor 1902 receives a signal from the light detector 1916 indicative of the voltage of the light reflected from the pupil of the eye of the user. The processor 1902 then subtracts the voltage due to the ambient light reflected from the pupil or other areas of the user from the voltage due to the light emitted by the light source 1916 and reflected from the pupil, and uses the difference in voltages to determine whether a user is gazing at the display 1912. The above-noted process may be repeated periodically (e.g. several times a second) so that the display system 1900 is calibrated to ambient conditions.

In some embodiments, the processor 1902 may store voltages received from the light detector 1916 for one or more time periods, and may determine the voltage threshold based on the stored voltages. For example, the processor 1902 may determine the voltage threshold as a percentage of a previously received voltage or a percentage of an average of two or more previously received voltages from the light detector 1916. The processor 1902 may determine a change in a percentage of the voltage received from the light detector 1916 in a current time period and the stored voltages for previous time periods. When the received voltage decreases to less than a specific percentage of the average of the previous voltage(s), the processor 1902 may control the display driver 1908 to turn off (or turn on) the display 1910. When the received voltage increases to a level that is greater than a threshold percentage of the average of the previous voltage(s), the processor 1902 may control the display driver 1908 to turn on (or turn off) the display 1910. The percentage may, for example, be in the range of about 8 to 12 percent.

Optionally, the processor 1902 may determine a ratio of the current passing through the light source 1914 and the current passing through the light detector 116 utilizing a voltage received from the light source 1914, Ve, and the voltage received from the light detector 1916, Vd. The processor 1902 may store the ratio for one or more time periods, determine a percentage change in the ratio utilizing the current ratio and the stored ratios, and compare the percentage change to a threshold for controlling the display 1910.

Figure 21:
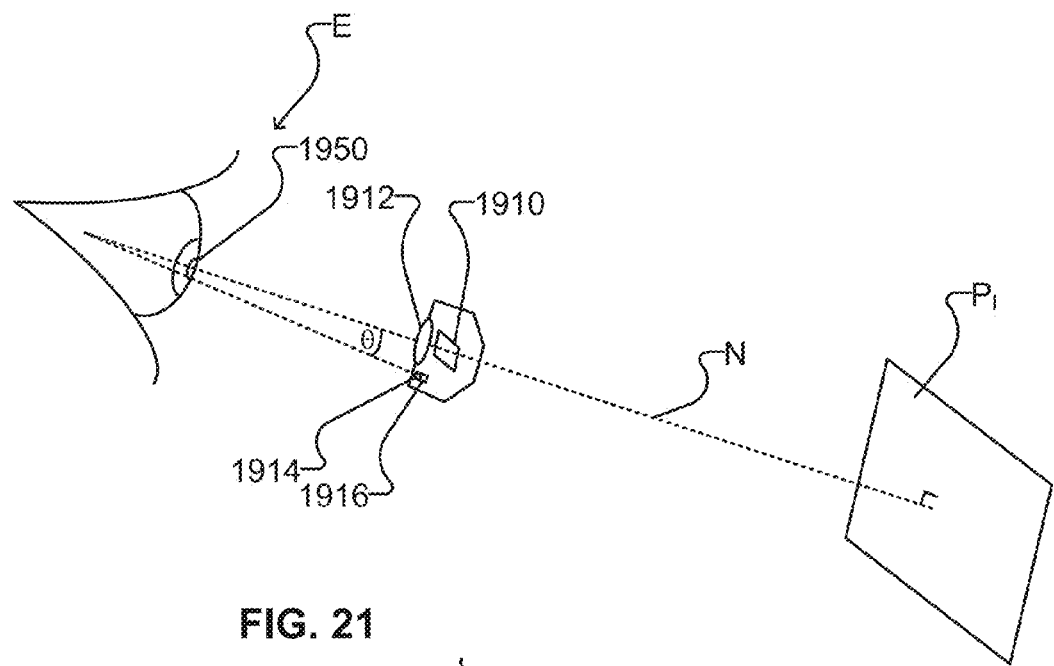
FIG. 21 illustrates example orientations of elements of the display system of FIG. 19.
Figure 21A:
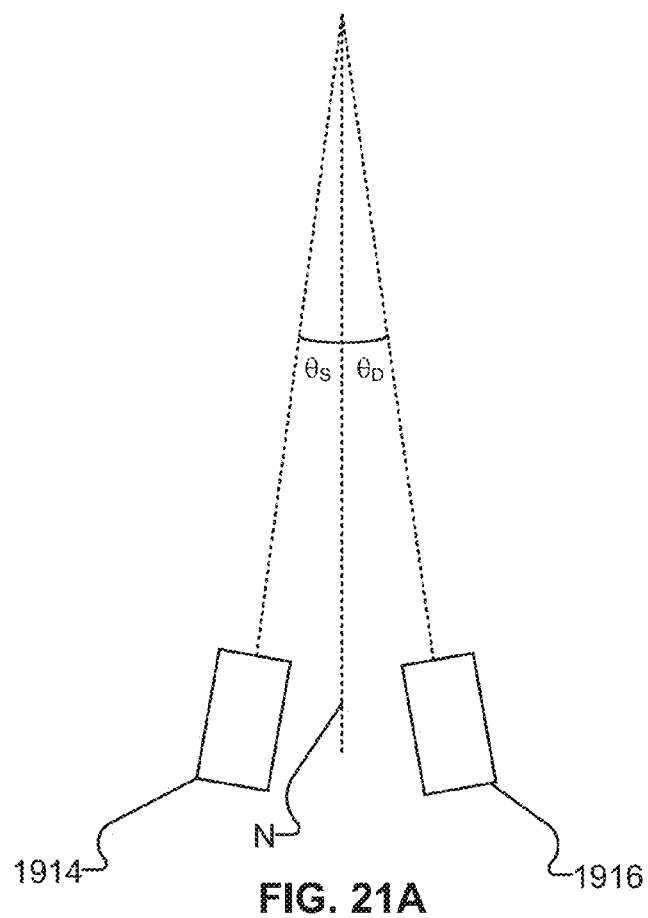
FIG. 21A illustrates example orientations of the light source and light detector of the display system of FIG. 19.

FIG. 21 shows an example of the orientation of the display 1910, lens assembly 1912, light source 1914 and light detector 1916 with respect to a user's eye E in some embodiments. The display 1910 and lens assembly 1912 are configured to generate an apparent image in an image plane $P_i$. A normal N passes through the lens assembly 1912 towards a pupil 1950. The light source 1914 and light detector 1916 are positioned such that their axes are at an angle θ with respect to the normal N. The axes of the light source 1914 and the light detector 1916 may be angled toward each other in some embodiments, as shown in FIG. 21A. In some embodiments, the light source may be positioned at an angle $θ_S$ (which may be about eight degrees) with respect to the normal N, and the light detector 1916 may be positioned at an angle $θ_D$ (which may also be about eight degrees) with respect to the normal N. The mutual angle between the axes of the light source 1914 and the light detector 1916 may be about 16 degrees in some embodiments.

Figure 21B:
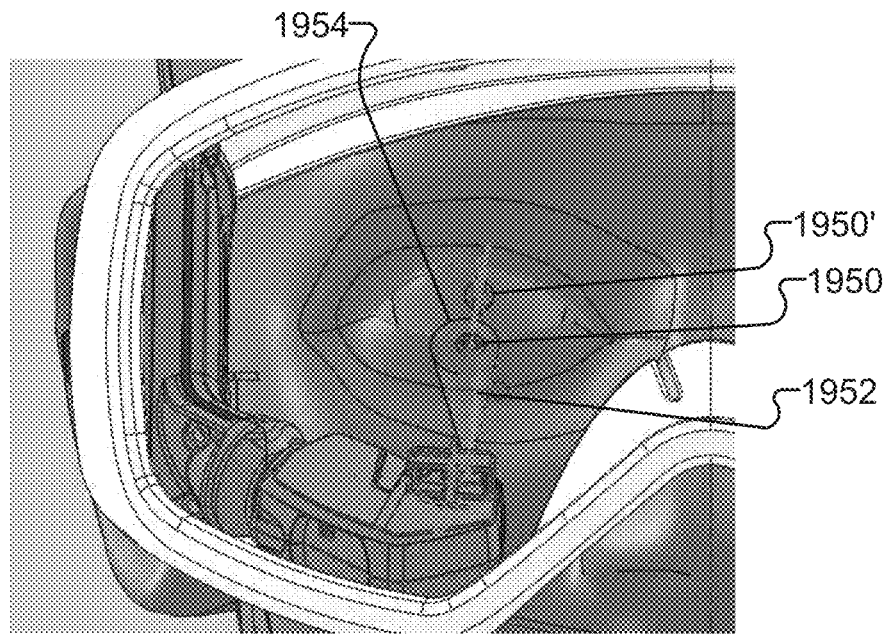
FIG. 21B illustrates an example emission angle of the light source of the display system of FIG. 19 and an example illumination area on a user's eye.

FIG. 21B schematically represents the positions of a user's pupil with respect to a cone 1952 of light from the light source 1914 and the resulting illumination area 1954. Reference number 1950 in FIG. 21B shows the pupil when the user is looking at the display 1910, and reference number 1950' shows the pupil when looking straight ahead. In some embodiments the cone 1952 is configured such that the illumination area 1954 encompasses all or substantially all of the pupil 1950 when the user is looking at the display 1910 without including the user's eyelid or face. In some embodiments the cone 1952 may have a half angle of about nine degrees.

Figure 22:
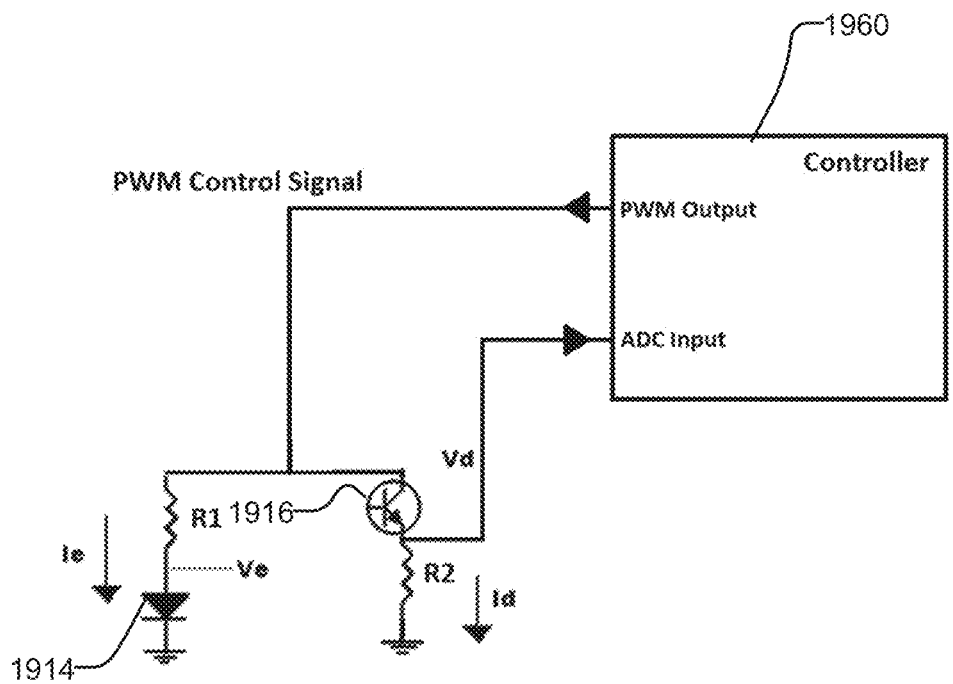
FIG. 22 is another example of a circuit diagram for a light source and a light detector of a glance detector.

FIG. 22 shows another example of a circuit diagram of the glance detector 1906 shown in FIG. 19. The light source 1914 and the light detector 1916 are connected in parallel between a controller 1960, and a ground. A first resistor R1 is connected between the controller 1960 and an anode of the light source 1914. A second resistor R2 is connected between an emitter of the light detector 1916 and the ground. The controller 1960 is configured to use pulse width modulation (PWM) to control the duty cycle and/or frequency of pulses of light emitted by the light source 1914. In the example shown in FIG. 22, the PWM signal from the controller 1960 provides both power and control for the light source 1914 and the detector 1916. In other embodiments, the PWM signal from the controller 1960 could be used only for controlling the light source 114 and the light detector 116, which may be powered from another source (e.g., through a switch from a battery that provides power to the rest of the system 1900). For example, if the voltage or current available from the controller 502 is not sufficient for the light source 1914 (and/or the light detector 1916), the controller 1960 may provide a signal to a transistor (not shown) operating as a switch to selectively connect the light source 1914 (and/or the light detector 1916)

to a higher voltage or current source (not shown). In some embodiments, the controller 1960 may be connected to provide two PWM signals—one for controlling (and optionally powering) the light source 1914 and one for controlling (and optionally powering) the light detector 1916, and the timing of the two PWM signals may be coordinated (e.g. based on the rise time of the light source 1914), as discussed above. A voltage is measured at Vd of the light detector 1916. In some embodiments, a voltage may also be measured at Ve as described further below.

The voltage at Vd may be measured, for example, by connecting Vd to an analog-to-digital converter that is incorporated in the controller 1960. The voltage at Vd increases as more light is detected by the light detector 1916. In some embodiments, the light source 1914 may be controlled to emit pulses of light, and the detected voltage may be sampled by the ADC at the middle of each pulse. Alternatively, the detected voltage may be sampled by the ADC at the end of the pulse, or at the three quarter point of the pulse. The controller 1960 may be configured to use pulse width modulation (PWM) to control the duty cycle and/or frequency of pulses of light emitted by the light source 1914 as described above with reference to FIG. 20.

In some embodiments, the light source 1914 and light detector 1916 may be incorporated into a small chip along with an ADC and minimal processing elements configured to provide a single binary output indicating whether or not the user is looking at the display 1910. In such embodiments additional communication lines (e.g. an I2C bus or the like) may be provided to a main processor of a heads up display system such that the processing elements on the chip can be reconfigured by the main processor.

A number of embodiments described above have referred to the use of goggles in describing the invention. However, the invention is equally applicable to helmets adapted to receive a HUD system similar to the HUD systems disclosed herein. For example, a motorcycle or other helmet may be modified or configured to receive HUD system 200 in substantially the same fashion as described herein. For example, a visor may be modified in a manner similar to the modifications of lens assembly 120 described above. Other components of a HUD system similar to HUD system 200 may be located in a recess defined in a helmet, in padding of a helmet or coupled to the outside of a helmet.

Also, aspects and features disclosed herein may be combined with other types of goggles or other headgear having HUD systems. For example, certain aspects or features of the examples discussed herein may be combined with or incorporated into aspects or features of the examples disclosed in International Application No. PCT/CA2012/050121, filed 29 Feb. 2012.

Where a component (e.g. an assembly, device, etc.) is referred to above, unless otherwise indicated, reference to that component (including reference to a means) should be interpreted as including as equivalents of that component any component which performs the same function as the described component, including components which are not structurally equivalent to the disclosed structures which perform the function in the illustrated exemplary embodiments of the invention.

Unless the context clearly requires otherwise, throughout the description and the claims, the words "comprise," "comprising," and the like are to be construed in an inclusive sense, that is, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, shall refer to this document as a whole and not to any particular portions. Where the context permits, words using the singular or plural number may also include the plural or singular number respectively. The word "or," in reference to a list of two or more items, covers all of the following interpretations of the word: any of the items in the list, all of the items in the list, and any combination of the items in the list.

Embodiments of the invention may be implemented using specifically designed hardware, configurable hardware, programmable data processors configured by the provision of software (which may optionally comprise 'firmware') capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application specific integrated circuits ("ASICs"), large scale integrated circuits ("LSIs"), very large scale integrated circuits ("VLSIs") and the like. Examples of configurable hardware are: one or more programmable logic devices such as programmable array logic ("PALs"), programmable logic arrays ("PLAs") and field programmable gate arrays ("FPGAs")). Examples of programmable data processors are: microprocessors, digital signal processors ("DSPs"), embedded processors, graphics processors, math co processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, media players, and other devices suitable for the purposes described herein. Those skilled in the relevant art will appreciate that aspects of the system can be practiced with other communications, data processing, or computer system configurations, including: Internet appliances, hand held devices (including personal digital assistants (PDAs)), wearable computers, all manner of cellular or mobile phones, multi processor systems, microprocessor based or programmable consumer electronics (e.g., video projectors, audio visual receivers, displays, such as televisions, and the like), set top boxes, color grading tools, network PCs, mini computers, mainframe computers, and the like.

Aspects of the invention may also be provided in the form of a program product. The program product may comprise any non transitory medium which carries a set of computer readable instructions which, when executed by a data processor, cause the data processor to execute a method of the invention. Program products according to the invention may be in any of a wide variety of forms. The program product may comprise, for example, non transitory media such as magnetic data storage media including floppy diskettes, hard disk drives, optical data storage media, electronic data storage media including ROMs, flash RAM, EPROMs, hardwired or preprogrammed chips (e.g., EEPROM semiconductor chips), nanotechnology memory, or the like. The computer readable instructions on the program product may optionally be compressed or encrypted.

In some embodiments, aspects of the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context or via other means suitable for the purposes described above.

Where a component (e.g. an assembly, software module, processor, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub combinations as may reasonably be inferred. The scope of the claims should not be limited by the preferred embodiments set forth in the examples, but should be given the broadest interpretation consistent with the description as a whole.

What is claimed is:

1. A display system for a head-mounted device comprising:
a display for displaying information;
a glance detector disposed proximate the display and comprising:
a light source for transmitting light toward a pupil of an eye of a user of the head-mounted device, the light source oriented to project light to illuminate an illumination area that at least substantially encompasses the user's pupil when the user is looking at the display; and
a light detector for detecting light reflected from the illumination area and generating a voltage based on the detected light; and
a processor for controlling the display and receiving the voltage from the glance detector, the processor configured to turn-on the display based on the voltage received from the glance detector.

2. The display system according to claim 1, wherein the processor is configured to turn on the display when the voltage received from the glance detector is less than a threshold voltage.

3. The display system according to claim 1, wherein the processor is configured to turn on the display when the voltage received from the glance detector is greater than a threshold voltage.

4. The display system according to claim 1, wherein the light detector generates a voltage based on the detected light in a first time period, and generates a voltage based on the detected light in a second time period, and the processor is configured to determine a change in a percentage of the voltage generated in the first and second time periods, and controls the display based on the change in the percentage.

5. The display system according to claim 4, wherein the processor is configured to turn on the display when the change in the percentage exceeds a predetermined value.

6. The display system according to claim 2, wherein the processor is configured to set the threshold voltage based on calibration of the display system.

7. The display system according to claim 3, wherein the processor is configured to set the threshold voltage based on calibration of the display system.

8. The display system according to claim 2, wherein the processor is configured to set the threshold voltage based on one or more previously received voltages.

9. The display system according to claim 3, wherein the processor is configured to set the threshold voltage based on one or more previously received voltages.

10. The display system according to claim 1, wherein the light source is an infrared light emitting diode for transmitting infrared light, and the light detector is an infrared photo detector.

11. The display system according to claim 1, wherein the light source is a near infrared light emitting diode for transmitting near infrared light, and the light detector is a near infrared photo detector.

12. The display system according to claim 1, wherein the light source is a low power infrared laser for transmitting infrared light, and the light detector is an infrared photo detector.

13. The display system according to claim 2, wherein the processor is configured to control the display to turn-off the display when the voltage received from the glance detector is greater than the threshold voltage.

14. The display system according to claim 2, wherein the processor is configured to control the display to maintain the display in a power-saving state when the voltage received from the glance detector is greater than the predetermined threshold voltage.

15. The display system according to claim 3, wherein the processor is configured to control the display to turn-off the display when the voltage received from the glance detector is less than the predetermined threshold voltage.

16. The display system according to claim 3, wherein the processor is configured to control the display to maintain the display in a power-saving state when the voltage received from the glance detector is less than the predetermined threshold voltage.

17. The display system according to claim 1, wherein the glance detector comprises one or more ambient light sensors for receiving ambient light reflected from the pupil of the eye of the user, and wherein the glance detector is calibrated based on the received ambient light.

18. The display system according to claim 1, wherein the processor is configured to determine a current associated with the transmitted light, determine a current associated with the detected light, determine a ratio of the current associated with the transmitted light to the current associated with the detected light, and control the display to turn-on the display when the ratio is less than a predetermined value.

19. The display system according to claim 1, wherein the glance detector is disposed in a housing of a display unit configured to be adjustably received in a display mount coupled to a goggles lens.

20. The display system according to claim 19, comprising at least one baffle extending outwardly from the housing around at least one of the light source and the light detector.

21. The display system according to claim 19, wherein the housing is constructed from a material which blocks infrared light and/or ultraviolet light.

22. The display system according to claim 19 wherein the glance detector is covered with a material that is opaque to light in the visible spectrum but transparent to infrared light.

23. A method of controlling a display system for a head-mounted device, comprising:
  transmitting, utilizing a light source, light toward a pupil of an eye of the user of the head mounted device to illuminate an illumination area that at least substantially encompasses the user's pupil when the user is looking at the display;
  detecting, utilizing a light detector, light reflected from the illumination area;
  determining a voltage based on the detected light;
  controlling a display to turn-on the display based on the determined voltage.

* * * * *